United States Patent
Miwa et al.

[11] Patent Number: 5,964,820
[45] Date of Patent: Oct. 12, 1999

[54] DIESEL ENGINE EXHAUST RECIRCULATING SYSTEM DIAGNOSTIC

[75] Inventors: Hiromichi Miwa, Yokohama; Takashi Shirakawa, Yokosuka, both of Japan

[73] Assignee: Nissan Motor Co., Ltd., Yokohama, Japan

[21] Appl. No.: 08/970,149

[22] Filed: Nov. 13, 1997

[30] Foreign Application Priority Data

Nov. 13, 1996 [JP] Japan ................................ P8-301669

[51] Int. Cl.⁶ ............................ F02M 25/07; F02D 41/22
[52] U.S. Cl. .................. 701/108; 123/568.16; 73/117.3; 73/118.2
[58] Field of Search .................................... 701/104, 108, 701/102; 123/568.16, 676; 73/117.3, 118.2, 118.1

[56] References Cited

U.S. PATENT DOCUMENTS

| | | | |
|---|---|---|---|
| 4,433,666 | 2/1984 | Masaki et al. | 123/568.22 |
| 5,152,273 | 10/1992 | Ohuchi | 123/568.16 |
| 5,205,260 | 4/1993 | Takahashi et al. | 123/494 |
| 5,471,051 | 11/1995 | Matsumoto et al. | 123/568.16 |
| 5,635,212 | 6/1997 | Hotta et al. | 123/568.16 |

FOREIGN PATENT DOCUMENTS 6-249077  9/1994  Japan .
7-42622   2/1995  Japan .

*Primary Examiner*—Willis R. Wolfe
*Assistant Examiner*—Hieu T. Vo
*Attorney, Agent, or Firm*—Foley & Lardner

[57] ABSTRACT

An intake pressure and exhaust pressure of an engine are predicted from a fresh air flowrate in a diesel engine comprising an exhaust gas recirculation system and a sensor for detecting the fresh air flowrate. A fault in the system is diagnosed based on the predicted intake pressure and exhaust pressure. Preferably, fault diagnosis in the exhaust gas recirculation system is based on a differential pressure between the intake pressure and exhaust pressure, or on a comparison of an estimated EGR rate and target EGR rate found from the intake pressure and exhaust pressure, without providing any special sensors. Smoke emission is also reduced by limiting the maximum fuel injection amount of the engine.

14 Claims, 25 Drawing Sheets

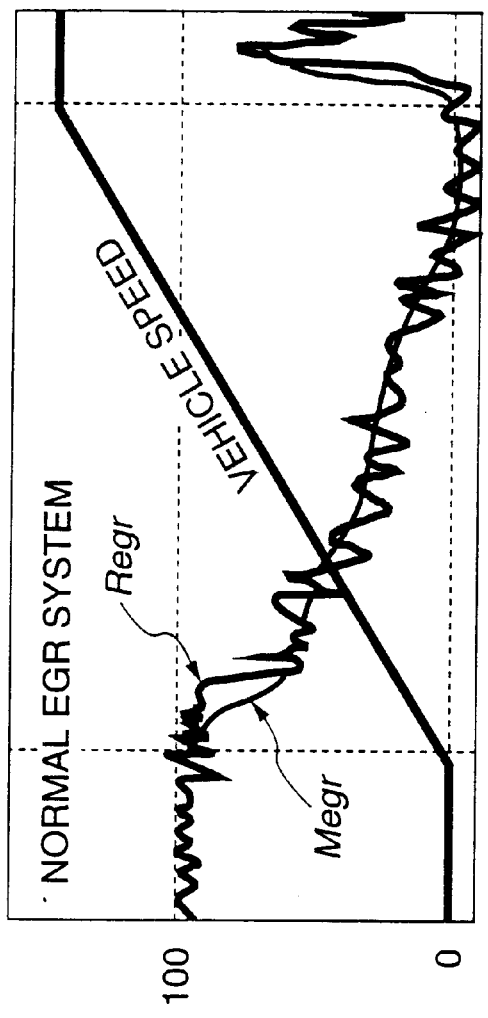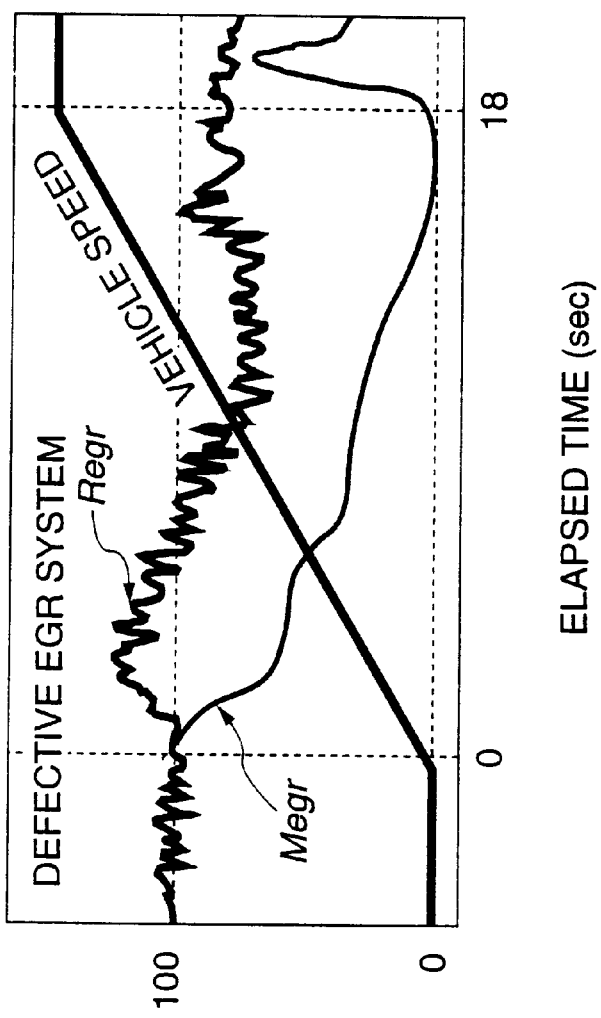
FIG. 34A
FIG. 34B

DIESEL ENGINE EXHAUST RECIRCULATING SYSTEM DIAGNOSTIC

FIELD OF THE INVENTION

This invention relates to fault diagnosis of an exhaust recirculating device in a diesel engine.

BACKGROUND OF THE INVENTION

In diesel engines, an exhaust gas recirculating system (EGR system) is widely used wherein a part of the exhaust gas is recirculated to lower the combustion temperature in order to reduce discharge of nitrogen oxide (NOx).

Tokkai Hei 6-249077 published by the Japanese Patent Office in 1994 discloses an EGR system fault detecting device wherein a differential pressure is detected before and after an EGR valve using a pressure sensor, and fault diagnosis is performed based on this differential pressure. Also, Tokkai Hei 7-42622 published by the Japanese Patent Office in 1995 discloses a device wherein a temperature sensor is provided in an EGR passage, and fault diagnosis is performed based on the temperature in the EGR passage.

Both these devices require a sensor to be provided to perform the diagnosis, and this increased the cost of diagnosis device.

There was also a problem in that it was not possible to diagnose if a fault occurs in the sensor.

SUMMARY OF THE INVENTION

It is therefore an object of this invention to provide a diagnostic device of high accuracy which can detect a fault in an EGR system without using a special sensor for the diagnosis.

It is a further object of this invention to reduce smoke emission in EGR system faults.

In order to achieve the above objects, this invention provides a device for diagnosing a fault in an exhaust gas recirculation system of a diesel engine.

The device comprises a sensor for detecting a flowrate of fresh air entering the engine, and a microprocessor programmed to predict an intake pressure of the engine from the fresh air intake flowrate, predict an exhaust pressure of the engine from the fresh air intake flowrate, and determine whether or not there is a fault in the exhaust gas recirculation system based on the intake pressure and exhaust pressure.

It is preferable that the microprocessor is programmed to calculate a differential pressure by subtracting the intake pressure from the exhaust pressure, and to determine that there is a fault in the system when the differential pressure exceeds a predetermined value.

When the engine comprises a fuel injection device, it is preferable that the microprocessor is further programmed to calculate a differential pressure between the intake pressure and a predetermined reference pressure, and to decrease a maximum fuel injection amount of the fuel injection device the larger the differential pressure. When the engine comprises a fuel injection device, it is also preferable that the microprocessor is further programmed to calculate a differential pressure between the exhaust pressure and a predetermined reference pressure, and to decrease a maximum fuel injection amount of the fuel injection device the larger the differential pressure.

When the engine comprises a fuel injection device, it is also preferable that the microprocessor is further programmed to calculate a differential pressure by subtracting the intake pressure from the exhaust pressure, and to decrease a maximum fuel injection amount of the fuel injection device the larger the differential pressure.

When the exhaust gas recirculation system comprises an exhaust gas recirculation valve for regulating an exhaust gas recirculation amount based on a target EGR rate, it is preferable that the microprocessor is further programmed to calculate an exhaust gas recirculating flowrate from the intake pressure and exhaust pressure, calculate an estimated EGR rate from the fresh air flowrate and the exhaust gas recirculating flowrate, and determine whether or not there is a fault in the exhaust gas recirculation system based on the target EGR rate and the estimated EGR rate.

It is also preferable that the microprocessor is programmed to determine that there is a fault in the exhaust gas recirculation system when a difference between the target EGR rate and the estimated EGR rate is greater than a predetermined threshold value.

It is also preferable that the microprocessor is programmed to compare the difference between the target EGR rate and the estimated EGR rate with a plurality of different predetermined threshold values, and estimate an extent of a fault in the exhaust gas recirculation system according to the result of the comparison.

It is also preferable that the microprocessor is programmed to determine that there is a fault in the exhaust gas recirculation system when an integral value of a difference between the target EGR rate and the estimated EGR rate is greater than a predetermined threshold value.

It is also preferable that the microprocessor is programmed to compare an integral value of a difference between the target EGR rate and the estimated EGR rate with a plurality of different predetermined threshold values, and to determine the extent of a fault in the exhaust gas recirculation system according to the result of the comparison.

It is also preferable that the microprocessor is programmed to determine that there is a fault in the exhaust gas recirculation system when a ratio between the target EGR rate and the estimated EGR rate lies outside a predetermined range.

It is also preferable that the microprocessor is further programmed to determine whether or not the engine is in a transient running state, and not to perform the fault diagnosing when the engine is not in the transient running state.

It is also preferable that the fault diagnosis device further comprises a sensor for detecting a rotation speed of the engine, and that the microprocessor is programmed to determine whether or not the engine is in the transient running state based on a variation of engine rotation speed.

This invention provides another device for diagnosing a fault in an exhaust gas recirculation system of a diesel engine, comprising a mechanism for detecting a flowrate of fresh air entering the engine, a mechanism for predicting an intake pressure of the engine from the fresh air flowrate, a mechanism for predicting an exhaust pressure of the engine from the fresh air flowrate, and a mechanism for determining whether or not there is a fault in the exhaust gas recirculating system based on the intake pressure and the exhaust pressure.

The details as well as other features and advantages of this invention are set forth in the remainder of the specification and are shown in the accompanying drawings.

BRIEF DESCRIPTION OF THE DRAWINGS

FIGS. 34A and 34B are diagrams respectively showing a variation of EGR rate when an EGR valve 7 is operating normally, and when the EGR valve 7 is fixed.

DESCRIPTION OF THE PREFERRED EMBODIMENTS

Figure 1:
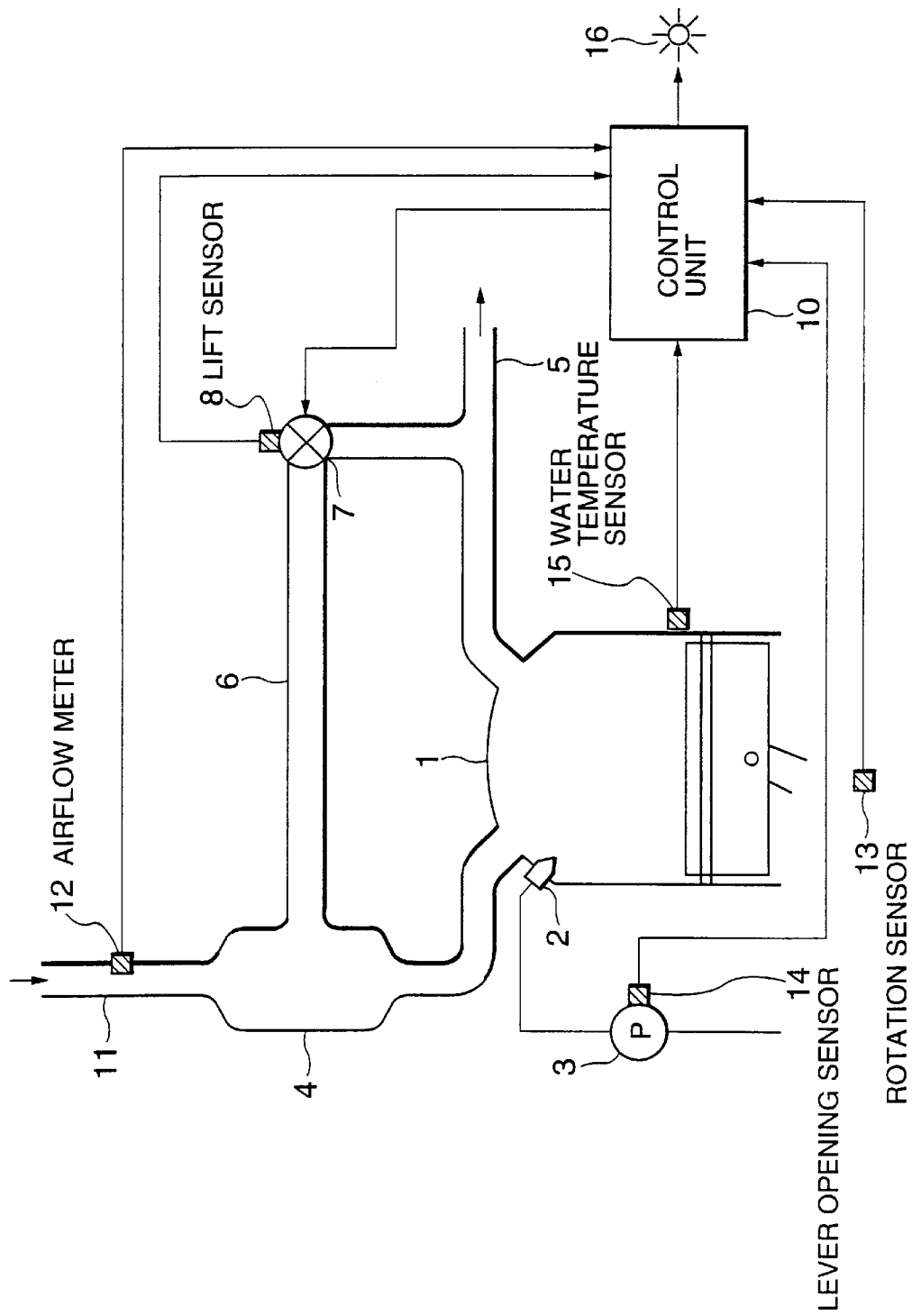
FIG. 1 is a schematic diagram of an EGR system diagnostic device according to this invention.

Referring to FIG. 1 of the drawings, fuel is supplied at high pressure from a fuel injection pump 3 by a fuel injection nozzle 2 provided for each combustion chamber of a multi-cylinder diesel engine 1 for a vehicle. Fuel injected by the fuel injection nozzle 2 is ignited by compression heat in the final stage of a compression stroke of the combustion chamber, and burnt.

An intake manifold 4 and exhaust manifold 5 are connected by an EGR passage 6. An EGR valve 7 for regulating an EGR amount in the EGR passage 6 and a lift sensor 8 for detecting a lift amount of the EGR valve 7, are provided. A step motor is built into the EGR valve 7. The step motor varies the lift amount of the EGR valve 7 according to the number of steps input as a signal to the step motor.

A control unit 10 is provided in order to control the lift amount of the EGR valve 7 and perform fault diagnosis of the EGR system.

Signals from an air flow meter 12 provided in an intake passage 11 of the engine 1, engine speed sensor 13 for detecting an engine speed Ne of the engine, lever opening sensor 14 for detecting a control lever opening CL which regulates a discharge amount of the fuel injection pump 3, i.e. the fuel injection amount, in response to an accelerator, water temperature sensor 15 for detecting the cooling water temperature of the engine 1, and a signal from the lift sensor 8, are input to the control unit 10.

Based on these signals, the control unit 10 outputs a signal to a duty control valve 9 so as to control an EGR amount. It also performs fault diagnosis of the EGR system, and a warning lamp 16 lights when it is determined that there is a fault.

Next, the fault diagnosis process performed by the control unit 10 will be described referring to FIGS. 2–22.

Figure 2:
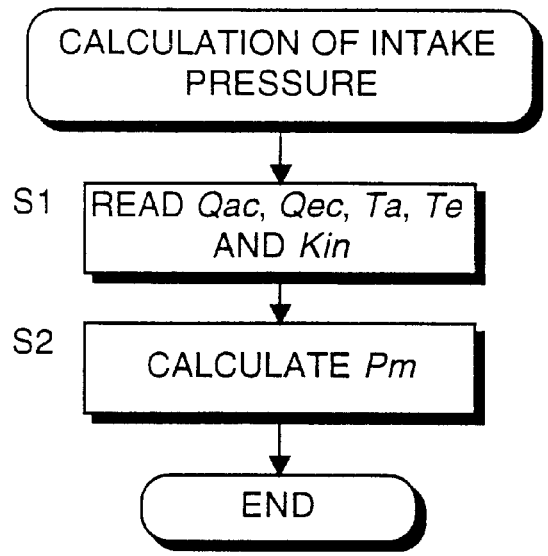
FIG. 2 is a flowchart to describe a calculation process of an intake pressure Pm performed by the diagnostic device.

FIG. 2 is a flowchart for computing an intake pressure of the engine 1.

First, a cylinder fresh air intake amount Qac, cylinder intake EGR gas flowrate Qec, fresh air intake temperature Ta, EGR gas temperature Te and volumetric efficiency equivalency value Kin are read in a Step S1. The computation of these values is described hereafter.

In a Step S2, the intake air pressure Pm is calculated by the following expression (1) using the aforementioned values.

$$Pm = \frac{R}{Kvol \cdot Kin} \cdot (Qac \cdot Ta + Qec \cdot Te) \cdot Kpm + Opm \quad (1)$$

where, R = gas constant,

Pm=intake air pressure, and

Kvol=volume of 1 cylinder/volume of intake air system, wherein the intake air system denotes the fresh air passage from the air flow meter to an intake throttle.

Also, Kin=volumetric efficiency equivalency value,

Qac=fresh air intake amount per cylinder,

Qec=EGR amount per cylinder,

Ta=fresh air temperature,

Te=EGR gas temperature, and

Kpm, Opm=constants.

Figure 3:
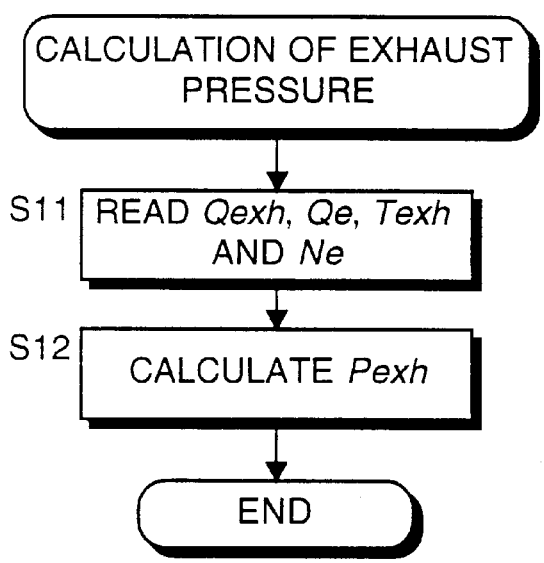
FIG. 3 is a flowchart to describe a calculation process of an exhaust pressure Pexh performed by the diagnostic device.

FIG. 3 is a flowchart for computing the exhaust pressure of the engine 1.

In a Step S11, a cyclic processing value Qexh of a discharge amount from a cylinder, EGR gas flowrate Qe, exhaust temperature Texh and engine rotation speed Ne are read. The computation of these values is described hereafter. In a Step S12, an exhaust pressure Pexh is calculated by the following expression (2) using the aforementioned values.

$$Pexh=(Qexh-Qe) \cdot Texh \cdot Ne \cdot Kpexh + Opexh \quad (2)$$

where, Pexh=exhaust pressure,

Qexh=cylinder exhaust volume cyclic processing value,

Qe=EGR amount,

Texh=exhaust temperature,

Ne=engine rotation speed, and

Kpexh, Opexh=constants.

Figure 4:
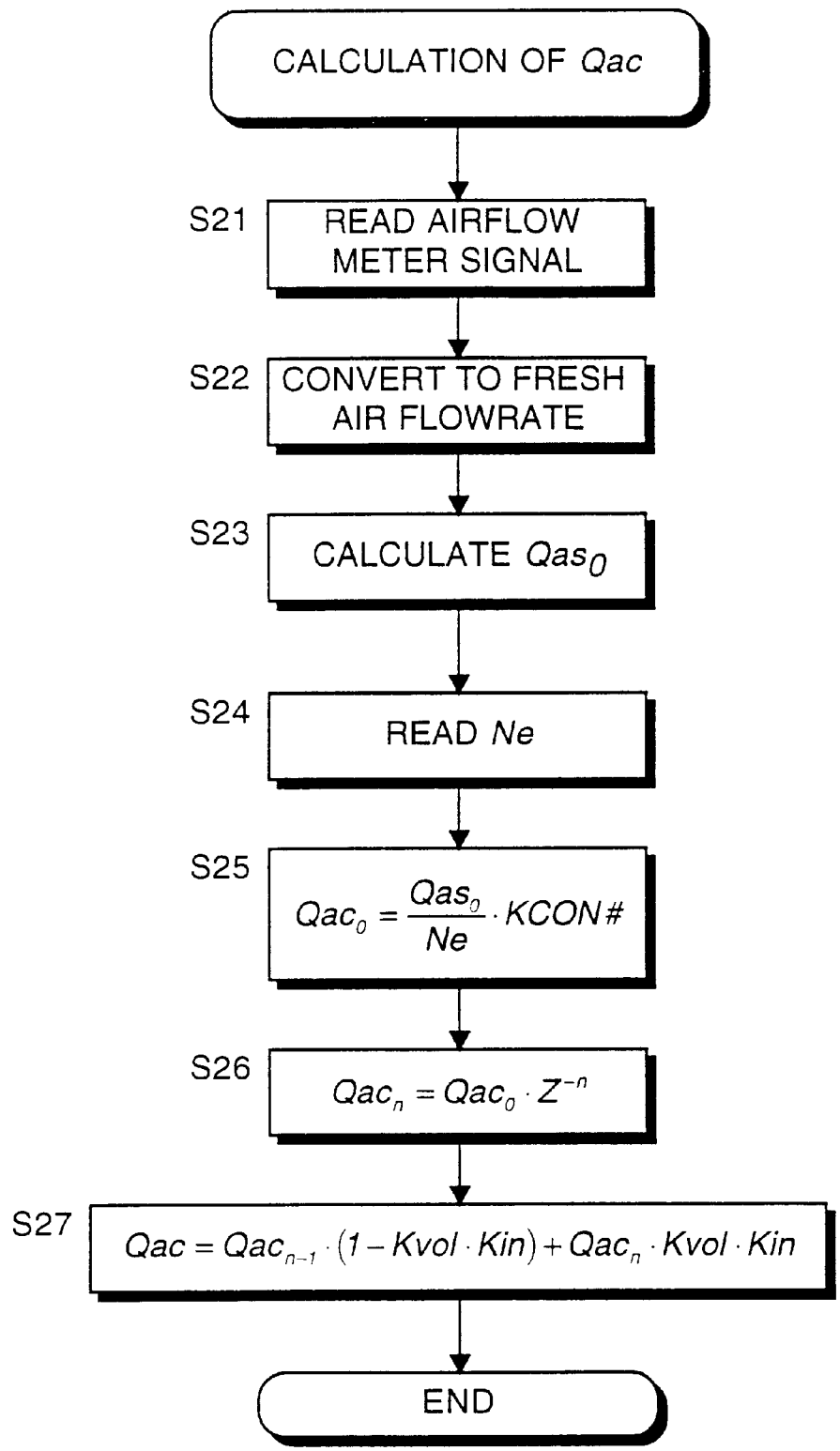
FIG. 4 is a flowchart to describe a calculation process of a fresh air intake amount Qac performed by the diagnostic device.

FIG. 4 is a flowchart showing a process of computing the cylinder fresh air intake amount Qac.

In a Step S21, an output voltage of an air flow meter 12 is read. In a Step S22, the output voltage is converted to a fresh air flowrate by looking up a table.

In a Step S23, weighted average processing is performed on the fresh air flowrate so as to obtain a weighted average fresh air flowrate $Qas_0$.

In a Step S24, the engine rotation speed Ne is read. In a Step S25, a fresh air intake amount $Qac_0$, per cylinder is calculated from the weighted average fresh air flowrate $Qas_0$, engine rotation speed Ne and a constant KCON#.

In a Step S26, delay processing corresponding to a computing time for n cycles is performed on the fresh air intake amount $Qac_0$, and a fresh air amount $Qac_n$ of an inlet part of the intake manifold 4 is calculated.

Also, in a Step S27, the cylinder fresh air intake amount Qac is calculated from the intake manifold inlet fresh air amount $Qac_n$ by the following expression using the volume ratio Kvol and the volumetric efficiency equivalency value Kin.

$$Qac=Qac_{n-1} \cdot (1-Kvol \cdot Kin)+Qac_n \cdot Kvol \cdot Kin \quad (3)$$

Figure 5:
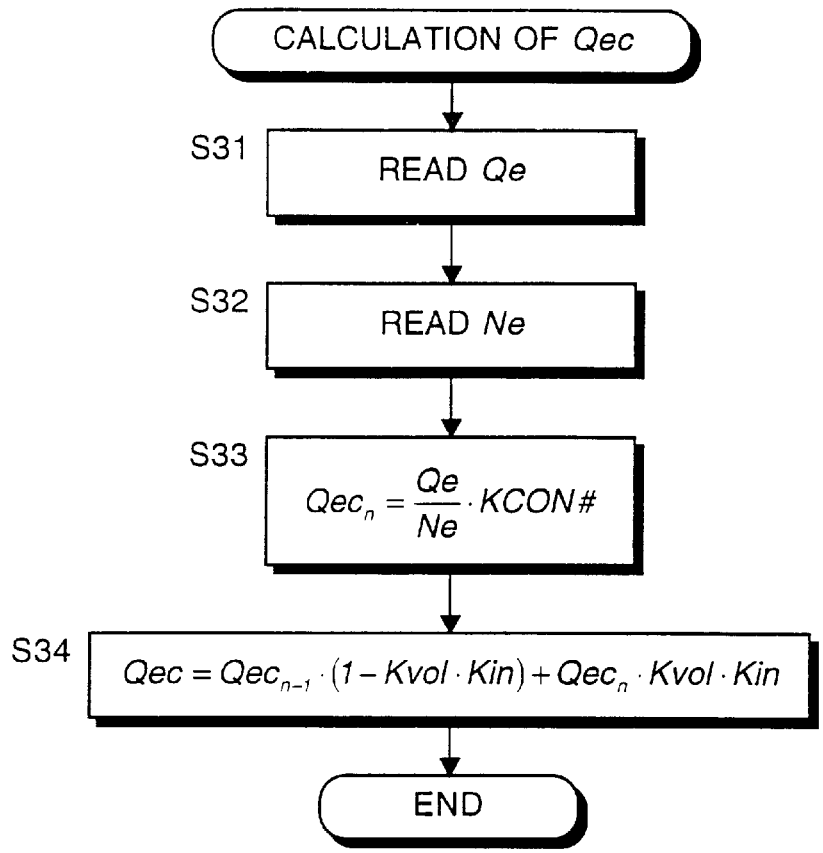
FIG. 5 is a flowchart to describe a calculation process of a cylinder inflow EGR gas flowrate Qec performed by the diagnostic device.

FIG. 5 is a flowchart showing a process for computing the cylinder intake EGR gas flowrate Qec.

First, in steps S31, S32, the EGR gas flowrate Qe and engine rotation speed Ne are read. The process of computing the EGR gas flowrate Qe is described hereafter.

In a Step S33, the intake EGR gas flowrate $Qec_n$, per cylinder is calculated from the EGR gas flowrate Qe and engine rotation speed Ne and constant KCON#. In a Step S34, the cylinder intake EGR gas flowrate Qec is calculated by the following expression using the volume ratio Kvol and volumetric efficiency equivalency value Kin.

$$Qec=Qec_{n-1} \cdot (1-Kvol \cdot Kin)+Qec_n \cdot Kvol \cdot Kin \quad (4)$$

Figure 6:
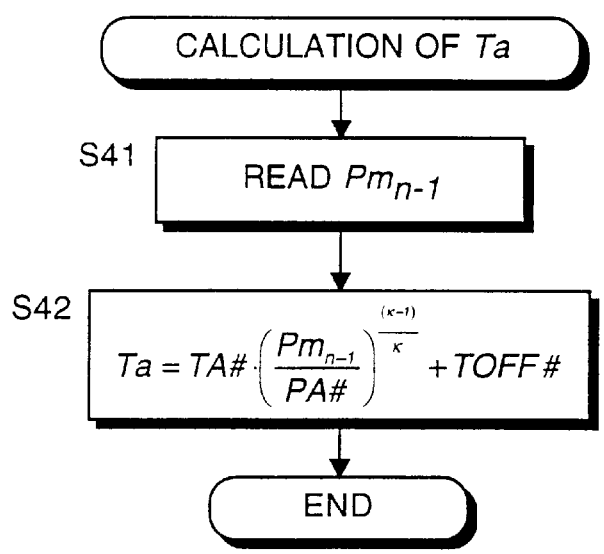
FIG. 6 is a flowchart to describe a calculation process of a fresh air intake temperature Ta performed by the diagnostic device.

FIG. 6 is a flowchart showing a process for computing the fresh air intake temperature Ta. This process is unnecessary in an engine comprising sensors for measuring the intake temperature.

First, in a Step S41, an intake pressure $Pm_{n-1}$ is read.

Next, in a Step S42, the fresh air intake temperature Ta is calculated by the following expression (5). This expression (5) is derived from basic of thermodynamic expressions.

$$Ta = TA\# \cdot \left(\frac{Pm_{n-1}}{PA\#}\right)^{\frac{(\kappa-1)}{\kappa}} + TOFF\# \quad (5)$$

where, TA#, PA# and TOFF# are all constants, and κ is a ratio of specific heat.

Figure 7:
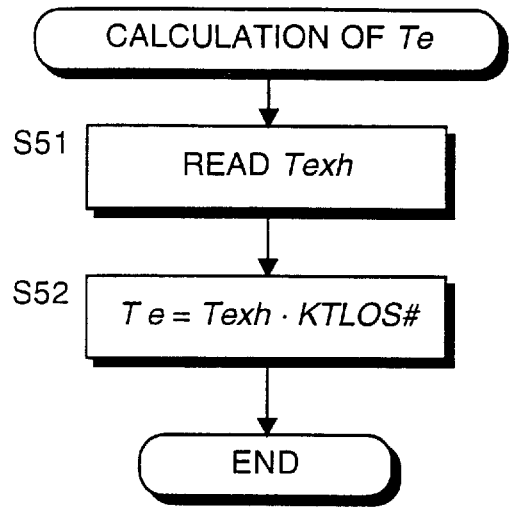
FIG. 7 is a flowchart to describe a calculation process of an EGR gas temperature Te performed by the diagnostic device.

FIG. 7 is a flowchart showing a process for computing the EGR temperature Te of the intake manifold inlet.

First, in a Step S51, the exhaust temperature Texh is read. The calculation of the exhaust temperature Texh is described hereafter.

In a Step S52, the EGR temperature Te is calculated by the following expression.

$$Te = Texh \cdot KTLOS\# \quad (6)$$

where, KTLOS#=constant.

Figure 8:
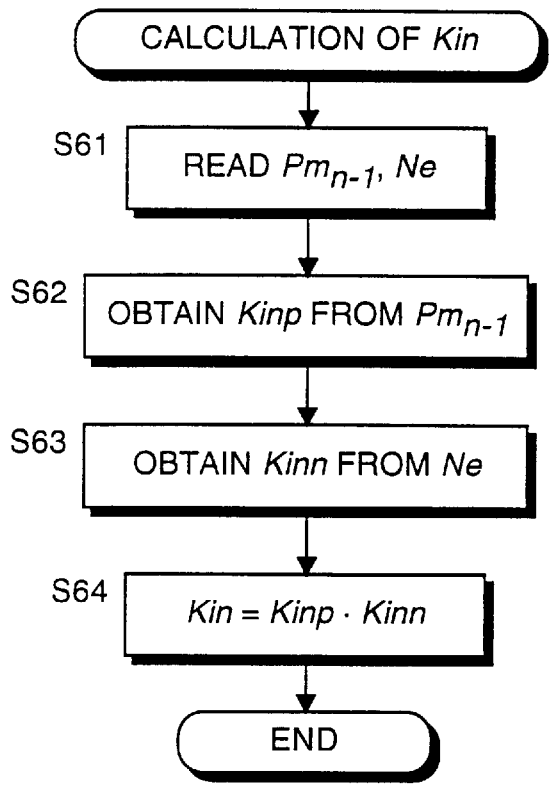
FIG. 8 is a flowchart to describe a calculation process of a volumetric efficiency equivalency value Kin performed by the diagnostic device.
Figure 9:
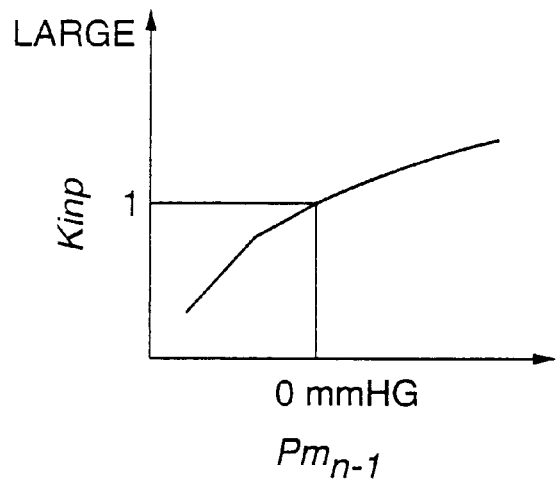
FIG. 9 is a diagram showing the contents of a table of a pressure compensation coefficient Kinp stored by the diagnostic device.
Figure 10:
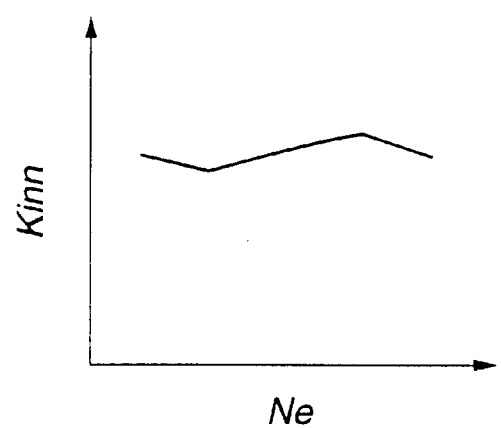
FIG. 10 is a diagram showing the contents of a table of a rotation compensation coefficient Kinn stored by the diagnostic device.

FIG. 8 is a flowchart showing a process for computing the volumetric efficiency equivalency value Kin.

First, in a Step S61, the intake pressure $Pm_{n-1}$ and engine rotation speed Ne are read. In a Step S62, a pressure compensation coefficient Kinp is found from the intake pressure $Pm_{n-1}$ using a table of the data shown in FIG. 9. In a Step S63, a rotation compensation coefficient Kinn is found from the engine rotation speed Ne using a table of the data shown in FIG. 10.

In a Step S64, the volumetric efficiency equivalency value Kin is calculated by applying these compensation coefficients.

Figure 11:
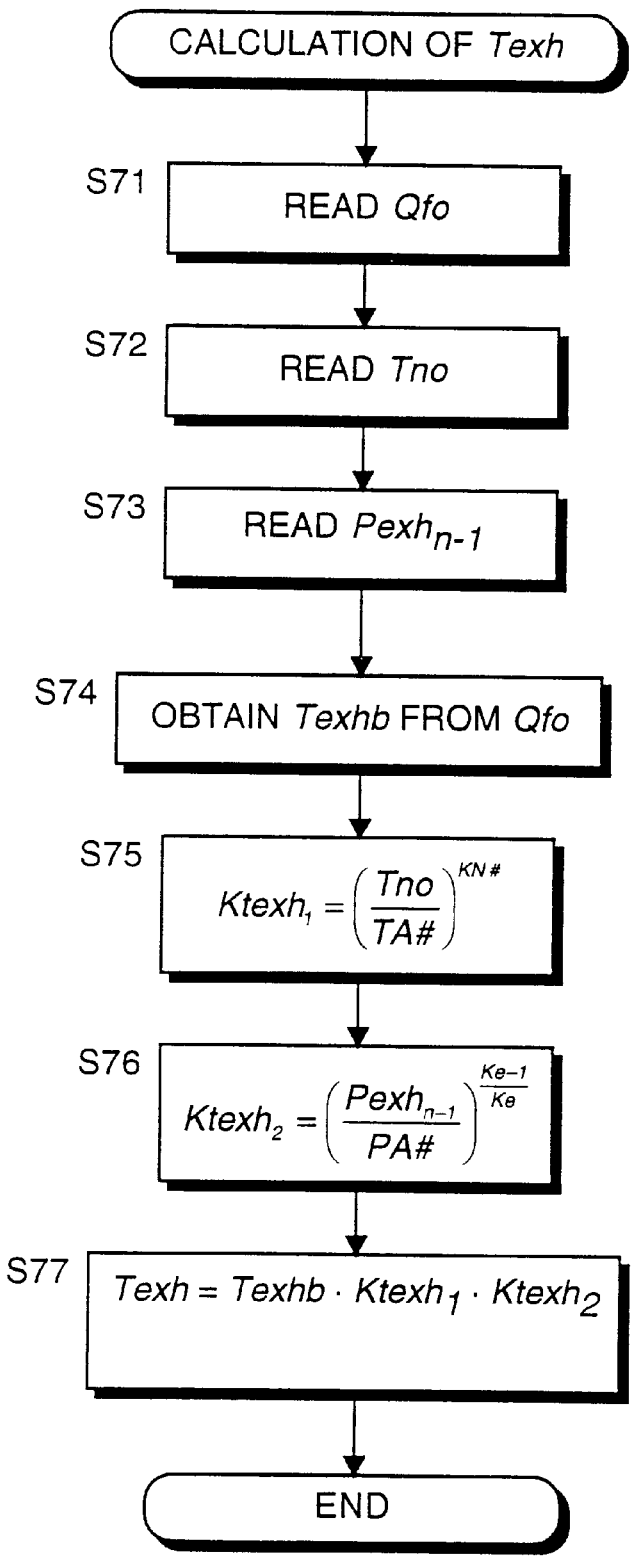
FIG. 11 is a flowchart to describe a calculation process of an exhaust temperature Texh performed by the diagnostic device.

FIG. 11 is a flowchart showing a process for computing the exhaust temperature Texh. This process is unnecessary in an engine comprising sensors for measuring exhaust temperature.

First, a cyclic processing value Qfo of a fuel injection amount is read in a Step S71, an intake temperature cyclic processing value Tno is read in a Step S72, and the exhaust pressure is read in a Step S73.

Figure 12:
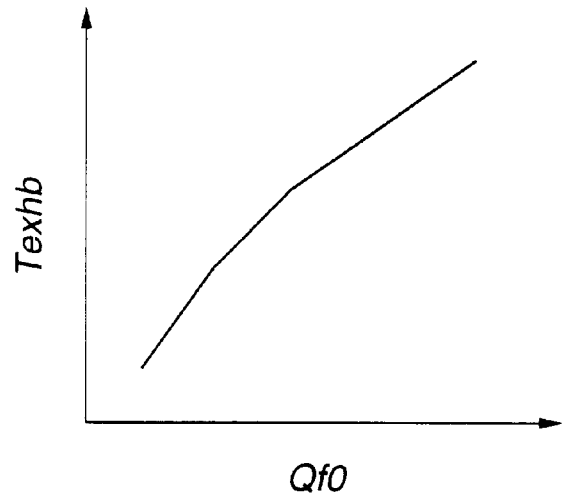
FIG. 12 is a diagram showing the contents of a table of an exhaust temperature Texh stored by the diagnostic device.

In a Step S74, an exhaust temperature base value Texhb is found from the cyclic processing value Qfo of the fuel injection amount using a table of the data shown in FIG. 12. The cyclic processing value is described hereafter.

In a Step S75, an intake temperature correction coefficient $Ktexh_1$ is calculated by the following expression from the intake temperature cyclic processing value Tno. Cyclic processing is described hereafter.

$$Ktexh_1 = \left(\frac{Tno}{TA\#}\right)^{KN\#} \qquad (7)$$

where, TA#, KN#=constants.

In a Step S76, a temperature rise compensation coefficient $Ktexh_2$ is calculated by the following expression from the exhaust pressure $Pexh_{n-1}$.

$$Ktexh_2 = \left(\frac{Pexh_{n-1}}{PA\#}\right)^{\frac{Ke-1}{Ke}} \qquad (8)$$

where, PA#, Ke=constants.

Both of the aforementioned expressions (7) and (8) are based on basic thermodynamic expressions.

In a Step S77, the exhaust temperature Texh is calculated by the following expression from the exhaust temperature base value Texhb, intake temperature correction coefficient Ktexh and temperature rise compensation coefficient $Ktexh_2$.

$$Texh = Texhb \cdot Ktexh_1 \cdot Ktexh_2 \qquad (9)$$

Figure 13:
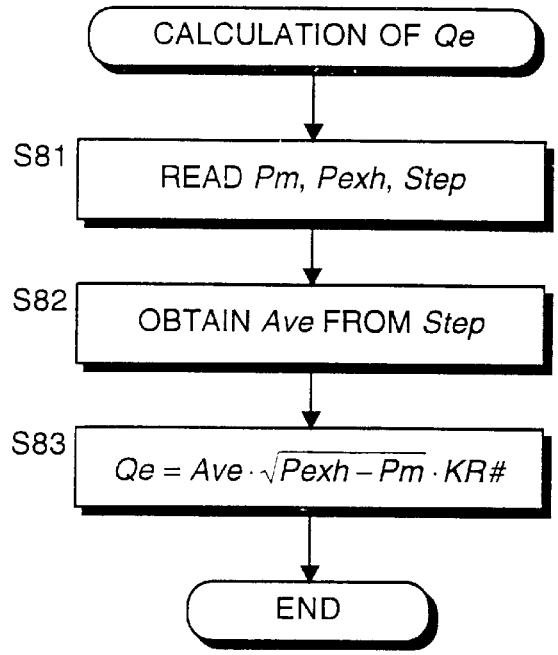
FIG. 13 is a flowchart to describe a calculation process of an EGR gas flowrate Qe performed by the diagnostic device.

FIG. 13 is a flowchart showing a process for computing the EGR gas flowrate Qe.

First, in a Step S81, the intake pressure Pm, exhaust pressure Pexh and the step number Step of the step motor of the EGR valve 7 are read. In a step S82, an EGR flowpath sectional area Ave is calculated from the number of steps Step using a table of the data shown in FIG. 14. In a step S83, the EGR gas flowrate Qe is calculated by the following expression (10). This expression is derived from Bernouilli's expression.

$$Qe = Ave \cdot \sqrt{Pexh - Pm} \cdot KR\# \qquad (10)$$

where, KR# is a constant which is effectively equal to $\sqrt{2 \cdot \rho}$ ($\rho$=exhaust density).

Figure 22:
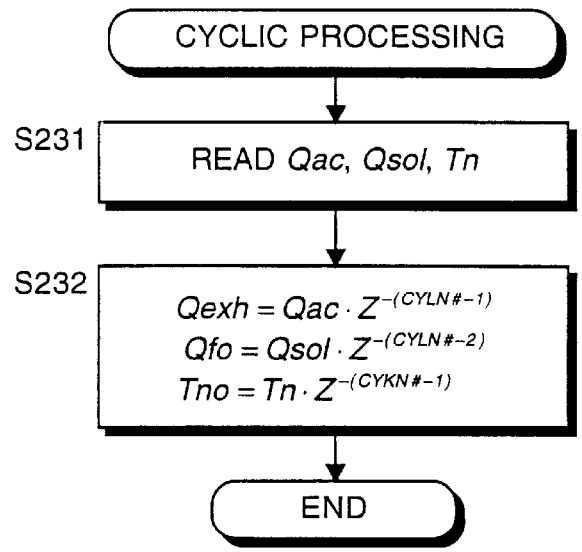
FIG. 22 is a flowchart to describe cyclic processing of a cylinder fresh air intake amount Qac, fuel injection amount Qsol and intake temperature Tn performed by the diagnostic device.

FIG. 22 is a flowchart showing a cyclic process for processing a cylinder intake temperature Tn, a fuel injection amount Qsol and the intake air amount Qac.

In a step S231, the cylinder intake fresh air amount Qac, fuel injection amount Qsol and cylinder intake temperature Tn are read. Herein, the cylinder intake fresh air amount Qac is a value obtained from the process of FIG. 4, the fuel injection amount Qsol is a value obtained from the output signal of the lever sensor 14, and the cylinder intake temperature Tn is calculated from the EGR temperature Te obtained from the fresh air intake temperature Ta obtained in the process of FIG. 6 and the EGR temperature Te obtained from the following expression (11).

$$Tn = \frac{Qac \cdot Ta + Qec \cdot Te}{Qac + Qec} \qquad (11)$$

In a step S232, regarding the cylinder fresh air intake amount Qac and cylinder intake temperature Tn, delay processing is performed on the number of cylinders of the engine 1 minus one cylinder so as to calculate the cylinder fresh air intake amount Qexh and fresh air temperature cyclic processing value Tno. Regarding the fuel injection amount Qsol, delay processing is performed on the number of cylinders of the engine 1 minus two cylinders by the expression (13) in order to calculate a cyclic processing value Qfo of the fuel injection amount. The equations (12)–(14) show a Z reverse conversion.

$$Qexh = Qac \cdot Z^{-(CYLN\#-1)} \qquad (12)$$

$$Qfo = Qsol \cdot Z^{-(CYLN\#-2)} \qquad (13)$$

$$Tno = Tn \cdot Z^{-(CYKN\#-1)} \qquad (14)$$

FIGS. 15, 17, 18 and 20 show EGR control flowcharts.

Figure 15:
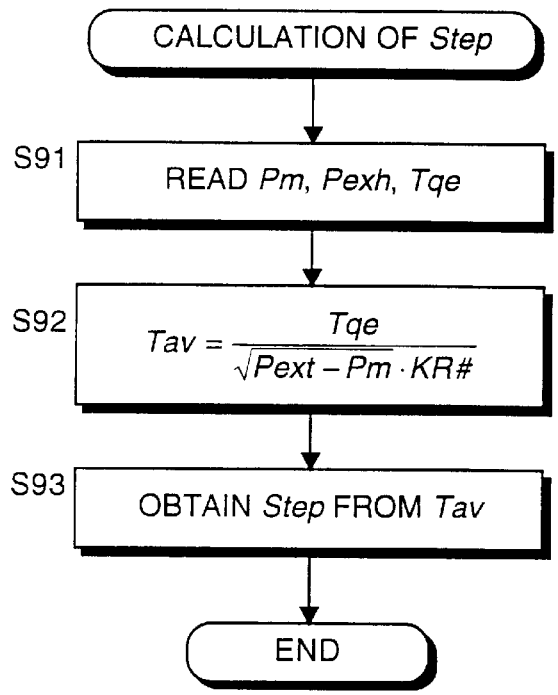
FIG. 15 is a flowchart to describe a calculation process of an EGR valve required flowpath sectional area Tav and a number of steps Step of a step motor performed by the diagnostic device.

FIG. 15 shows a calculation process of the number of steps Step of the step motor, and an EGR required flowpath sectional area Tav.

First, in a step S91, the intake pressure Pm, the exhaust pressure Pexh and a required EGR amount Tqe are read. In a step S92, the EGR valve required flowpath surface area Tav is calculated by the following expression. This expression is derived from Bernouilli's equation.

$$Tav = \frac{Tqe}{\sqrt{Pext - Pm} \cdot KR\#} \qquad (15)$$

Herein, KR# is the same constant as that described in the step S83.

Figure 16:
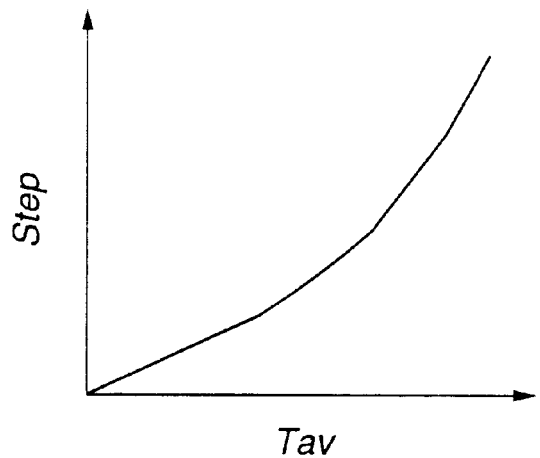
FIG. 16 is a diagram showing the contents of a table of the number of steps Step stored by the diagnostic device.
Figure 19:
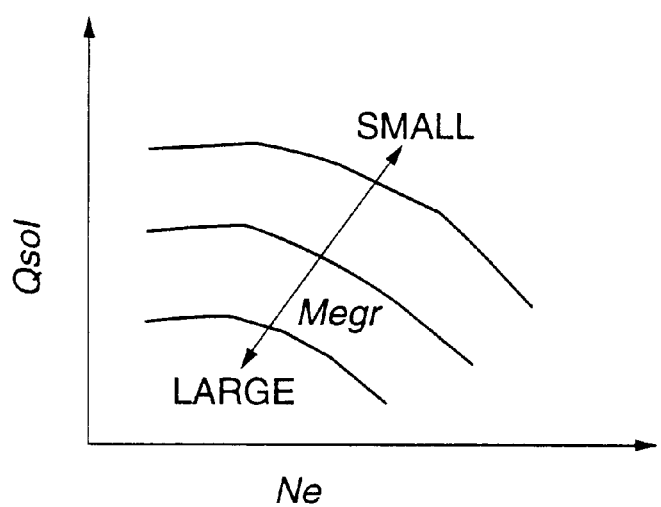
FIG. 19 is a diagram showing the contents of a map of a target EGR rate Megr stored by the diagnostic device.

In a step S93, the number of steps Step of the step motor is found from the EGR valve required flowpath sectional area Tav using the table of the data shown in FIG. 16.

Figure 17:
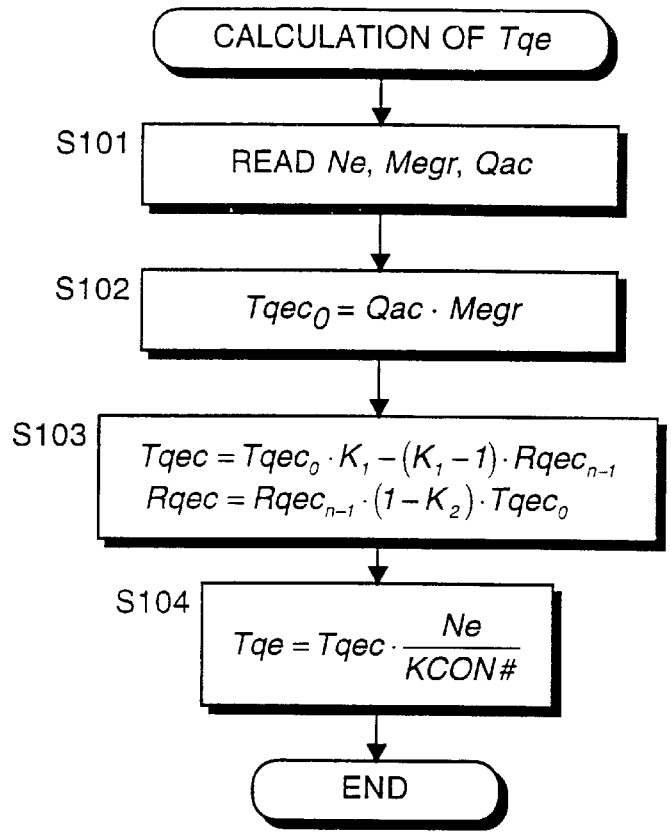
FIG. 17 is a flowchart to describe a calculation process of a required EGR amount Tqe performed by the diagnostic device.

FIG. 17 is a flowchart showing a process for computing the required EGR amount Tqe.

First, in a step S101, the engine rotation speed Ne, a target EGR rate Megr and the cylinder fresh air intake amount Qac are read. In a step 3102, the cylinder intake fresh air amount Qac is multiplied by the target EGR rate Megr so as to determine a target intake EGR amount $Tqeco_0$.

In a step S103, advance processing corresponding to the capacity of the intake system is performed on the target intake EGR Tqeco in order to calculate a target intake EGR amount processing value Tqec.

This advance processing is represented by the following equations (16) and (17).

$$Tqec = Tqec_0 \cdot K_1 - (K_1-1) \cdot Rqec_{n-1} \qquad (16)$$

$$Rqec = Rqec_{n-1} \cdot (1-K_2) \cdot Tqec_0 \qquad (17)$$

where, $K_1$=advance gain, and $K_2$=constant determined according to capacity of intake system.

In a step S104, the required EGR amount Tqe is calculated from a processing value Tqec, the engine rotation speed Ne and the constant KCON# by the following expression (18).

$$Tqe = Tqec \cdot \frac{Ne}{KCON\#} \qquad (18)$$

Figure 18:
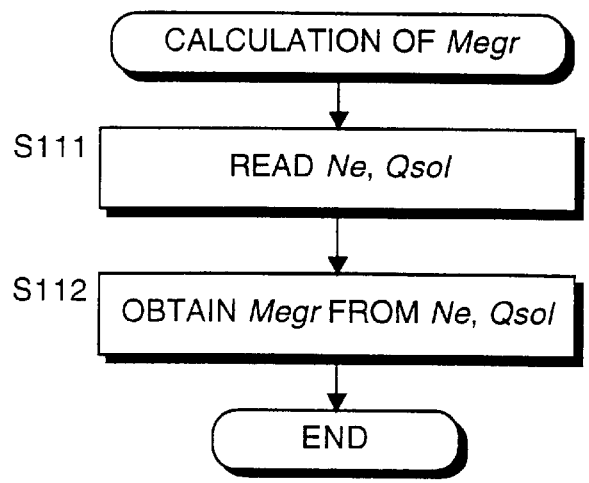
FIG. 18 is a flowchart to describe a calculation process of a target EGR rate Megr performed by the diagnostic device.

FIG. 18 is a flowchart showing a process for calculating a target EGR rate Megr.

First, in a step S111, the engine rotation speed Ne and the fuel injection amount Qsol are read. In a step S112, the EGR rate Megr is calculated from Ne and Qsol using a map of the data shown in FIG. 19.

Figure 20:
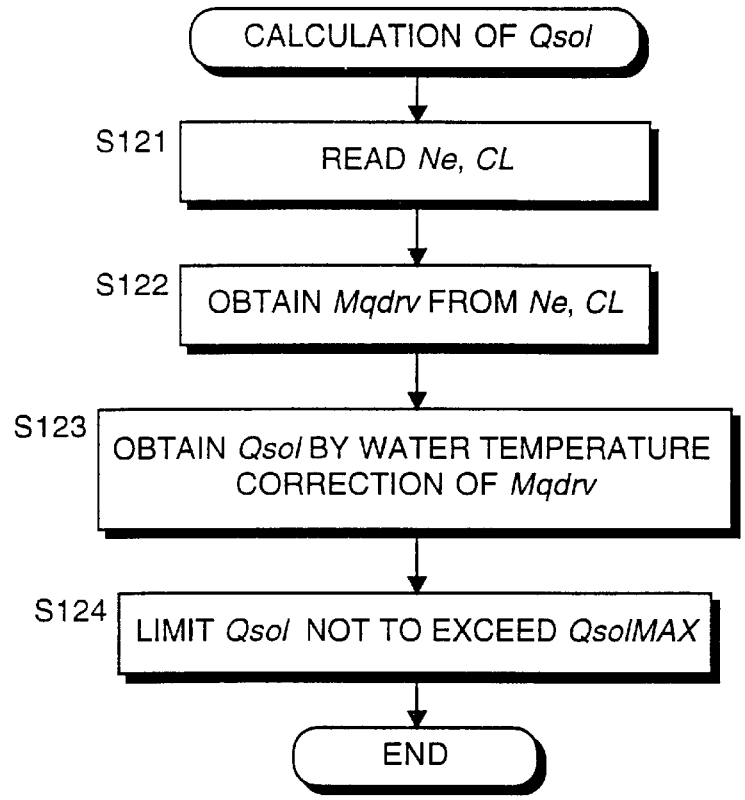
FIG. 20 is a flowchart to describe a calculation process of a fuel injection amount Qsol performed by the diagnostic device.

FIG. 20 is a flowchart showing a process for calculating the fuel injection amount Qsol.

First, in a step S121, the engine rotation speed Ne and a control lever opening CL are read.

Figure 21:
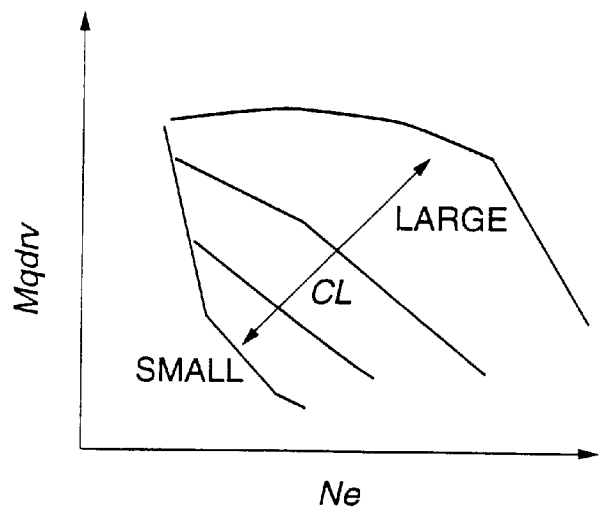
FIG. 21 is a diagram showing the contents of a map of a basic fuel injection amount Mqdrv stored by the diagnostic device.

In a step S122, a basic fuel injection amount Mqdrv is found from Ne and CL using a map of the data shown in FIG. 21.

In a step S123, water temperature corrections and other corrections are applied to the basic fuel injection amount Mqdrv so as to calculate the fuel injection amount Qsol.

In a step S124, the fuel injection amount Qsol is limited so as not to exceed the maximum fuel injection amount QsolMAX which was previously set according to engine running conditions.

Next, the fault diagnosis of the EGR system will be explained.

Figure 23:
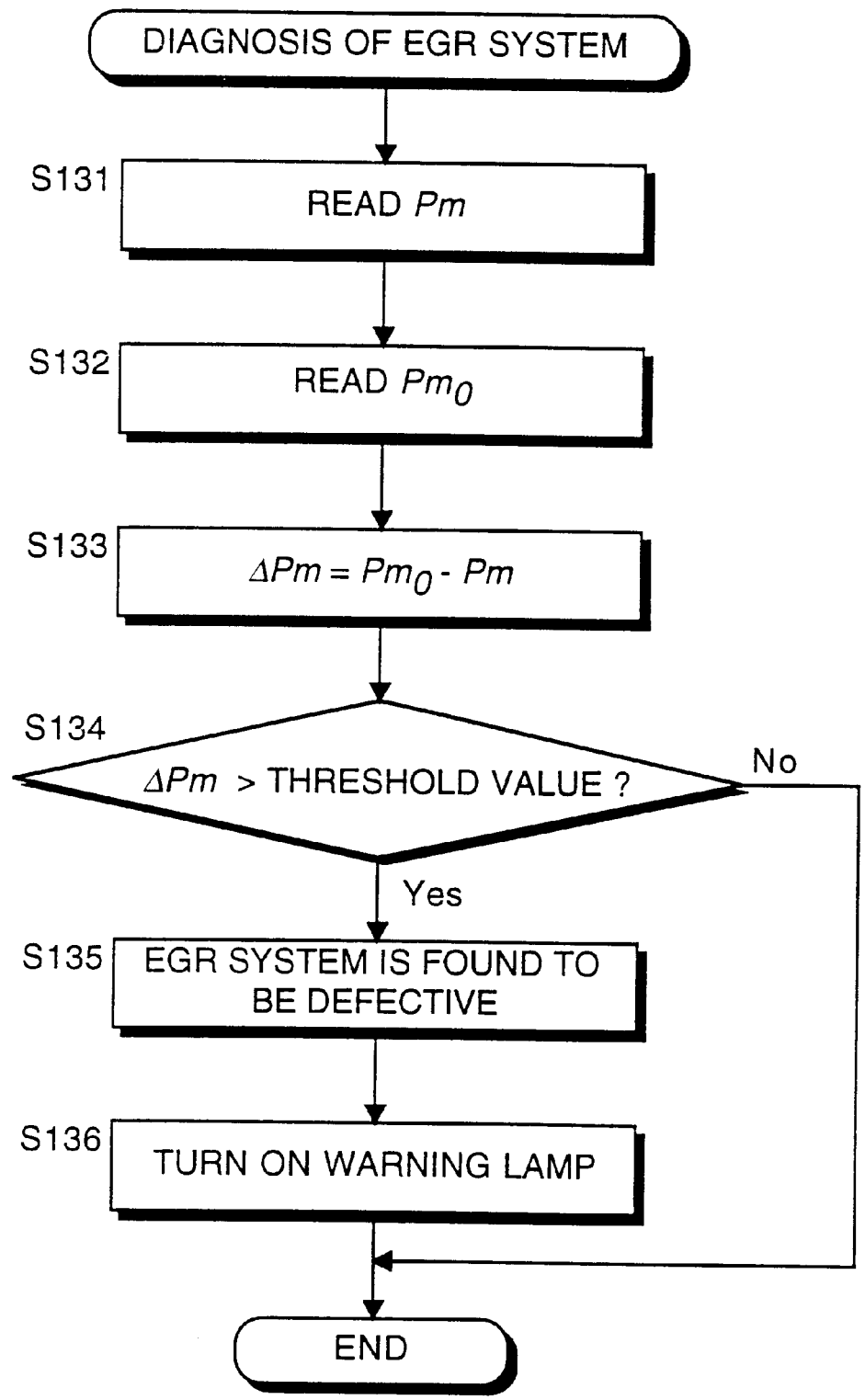
FIG. 23 is a flowchart to describe a fault diagnosis process based on intake air pressure.

FIG. 23 is a flowchart showing a fault diagnosis process based on the intake air pressure of the EGR system.

First, in a step S131, the intake pressure Pm is read.

A reference value $Pm_0$ of the intake pressure Pm, which was previously set according to various engine running conditions, is stored in the control unit 10. In a step S132, the reference value $Pm_0$ corresponding to the running conditions at that time is read, and in a step S133, a difference $\Delta Pm$ between the intake pressure Pm and the reference value $Pm_0$ is calculated.

In a step S134, $\Delta Pm$ is compared with a preset, predetermined value, and S134. When $\Delta Pm$ is greater than the predetermined value, it is determined in a step S135 that there is fault in the EGR system, in a step S136, a fault is indicated by turning on a warning lamp with which the vehicle is provided. When $\Delta Pm$ is less than the predetermined value in the step S134, the process terminates.

Figure 24:
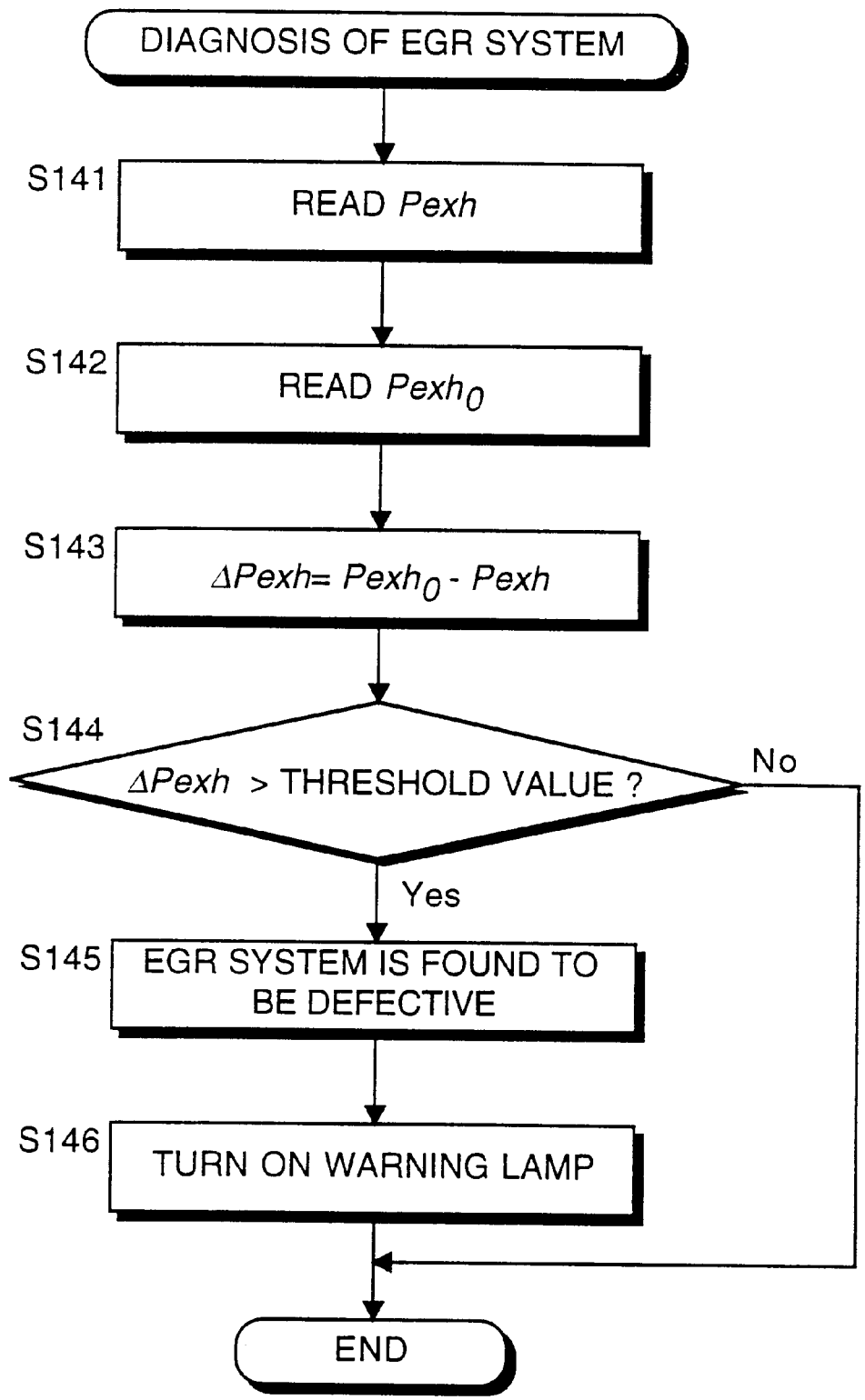
FIG. 24 is a flowchart to describe a fault diagnosis process based on exhaust pressure.

FIG. 24 is a flowchart showing a fault diagnosis process based on the exhaust pressure of the EGR system.

In this process, the intake pressure Pm of the diagnostic process based on the intake air pressure of FIG. 23 is replaced by the exhaust pressure Pexh, otherwise the process is identical to the process of FIG. 23.

Figure 25:
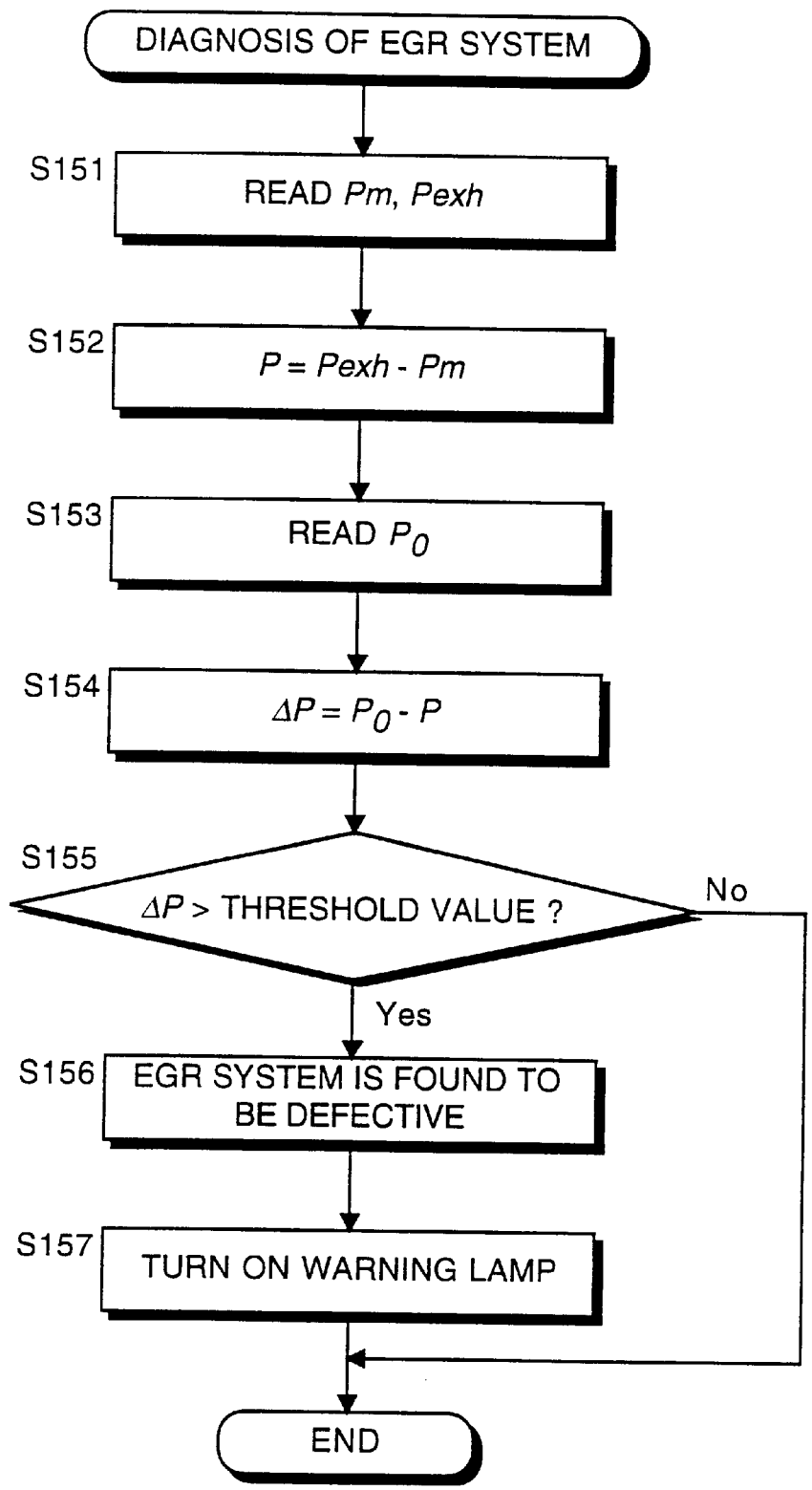
FIG. 25 is a flowchart showing a fault diagnosis process based on a differential pressure between an intake pressure and an exhaust pressure performed by the diagnostic device.

FIG. 25 is a flowchart describing a fault diagnosis process based on a differential pressure between the intake pressure and the exhaust pressure of the EGR system.

First, in a step S151, the intake pressure Pm and exhaust pressure Pexh are read.

In a step S152, a differential pressure P between Pm and Pexh is calculated.

A reference value $P_0$ of the differential pressure P which was set according to various running conditions, is stored in the control unit 10. In a step S153, the reference value $P_0$ corresponding to running conditions at of that time is read.

In a step S154, a difference $\Delta P$ between the differential pressure P and reference value $P_0$ is calculated.

In a step S155, the difference $\Delta P$ is compared with a preset value. When the difference $\Delta P$ is large, it is determined in a step S156 that there is a fault in the EGR system, and in a step S157, the fault is displayed by turning on a warning lamp with which the vehicle is provided. When the difference $\Delta P$ is less than the preset value in the step S155, the process terminates.

As shown in FIGS. 23, 24, the EGR system fault diagnosis can be performed based only on the intake pressure Pm or the exhaust pressure Pexh, however, a more accurate diagnosis can be performed based on the differential pressure between the intake pressure and exhaust pressure.

In the process shown in FIGS. 23–25, the reason why there is a difference between the calculated value and reference value for pressure is as follows. The reference value is based on the opening cross-sectional area of the EGR valve 7 assuming that the EGR valve 7 has no fault. When the EGR valve 7 has a fault and is fixed at a specified opening, the opening cross-sectional area is different from the calculated value, and the pressure is therefore different as a result.

Figure 26:
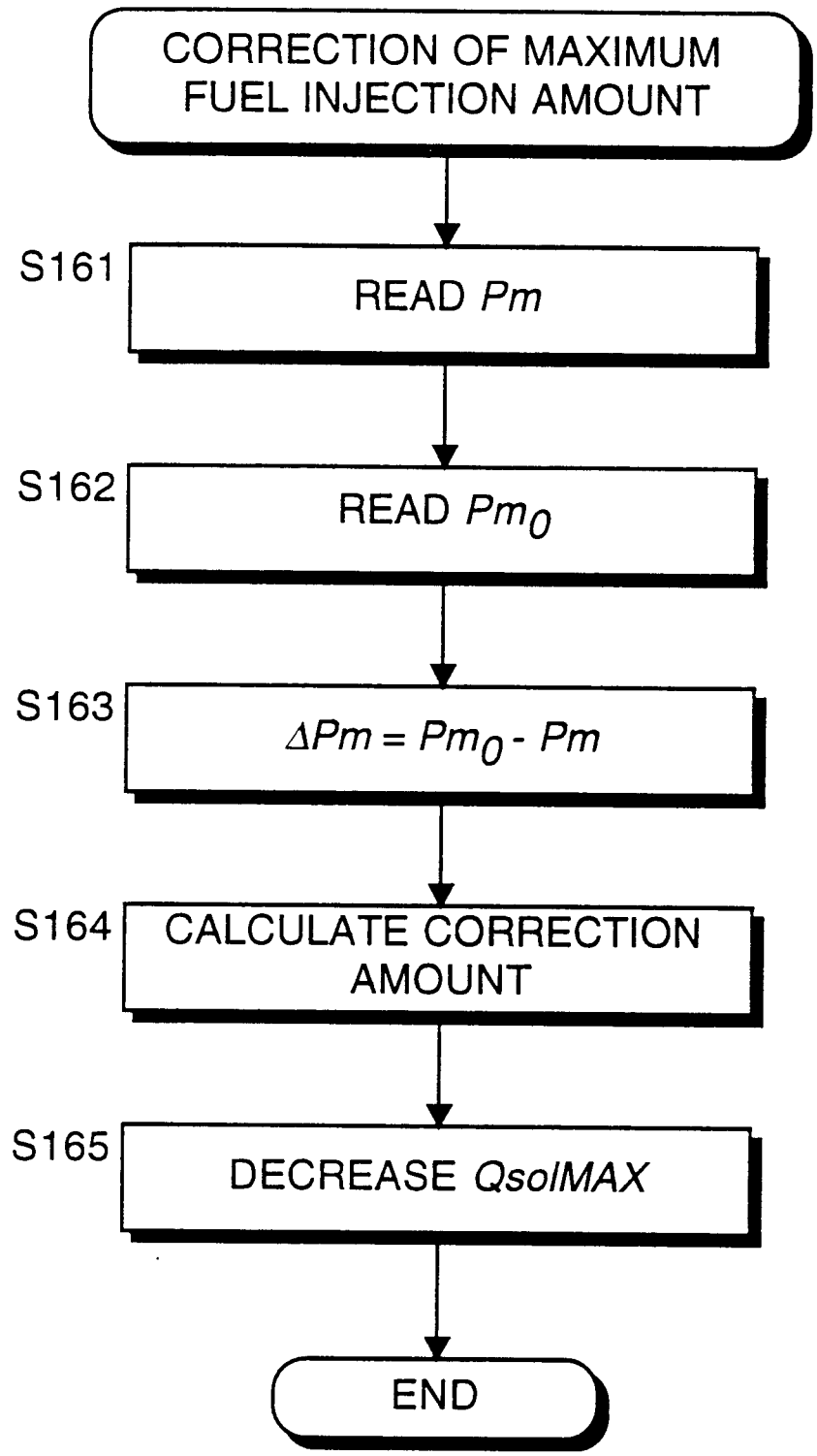
FIG. 26 is a flowchart to describe a process for compensating a maximum fuel injection amount based on the intake pressure Pm.

FIG. 26 is a flowchart for describing a process for compensating the maximum fuel injection amount based on the intake pressure Pm.

In a step S124 of FIG. 20, the fuel injection amount Qsol is limited so that it does not exceed a maximum fuel injection amount QsolMAX set previously according to engine running conditions, and in this process, this maximum fuel injection amount is further decreased according to the intake pressure Pm which was found in the step S2.

First, in a step S161, the intake pressure Pm is read. In a step S162, the reference value $Pm_0$ corresponding to running conditions at that time is read. The reference value $Pm_0$ is the same value as that used in the fault diagnosis process of FIG. 23. In a step S163, a difference $\Delta Pm = Pm_0 - Pm$ between the intake pressure Pm and the reference value $Pm_0$ is calculated.

Figure 29:
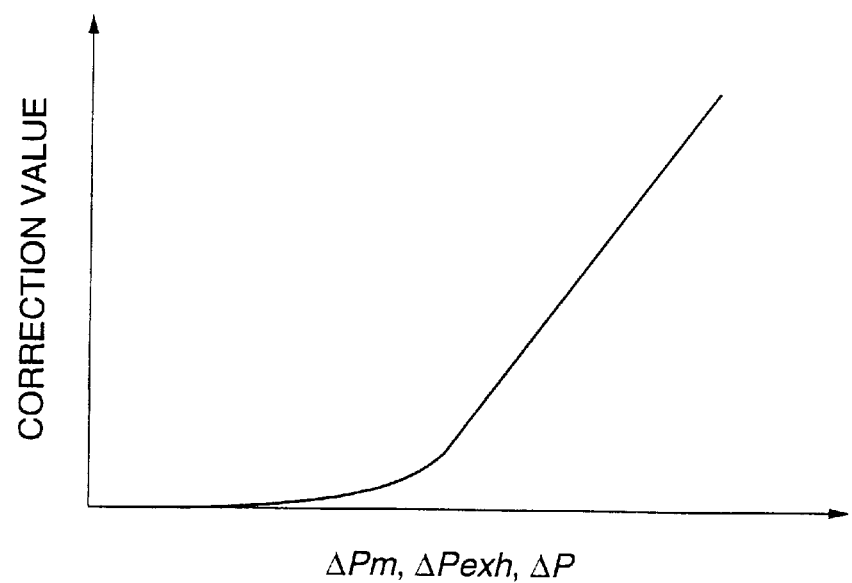
FIG. 29 is a diagram showing the contents of a map of a value for compensating the maximum fuel injection amount QsolMAX stored by the diagnostic device.

In a step S164, a correction value is found using a map shown in FIG. 29 according to the difference $\Delta Pm$, then in a step S165, the correction value is subtracted from the maximum fuel injection amount QsolMAX.

The effect of applying this correction is such that the correction becomes larger and the maximum fuel injection amount QsolMAX becomes less the larger the difference $\Delta Pm$, as shown in FIG. 29.

This processing is based on the following reason.

The amount of smoke generated by a diesel engine increases according to a decrease of an excess air coefficient in the combustion chamber. In other words, when the EGR amount increases relative to the amount of fresh air in the combustion chamber, the oxygen amount decreases and smoke tends to be produced more easily.

When the EGR valve 7 is fixed in the open state, EGR gas increases relatively and the excess air coefficient falls so that smoke is produced. In this case, the intake pressure Pm decreases due to the inflow of EGR gas. Therefore when the intake pressure Pm has decreased, smoke emission can be prevented by reducing the maximum fuel injection amount by the above process so that the excess air coefficient does not fall.

Figure 27:
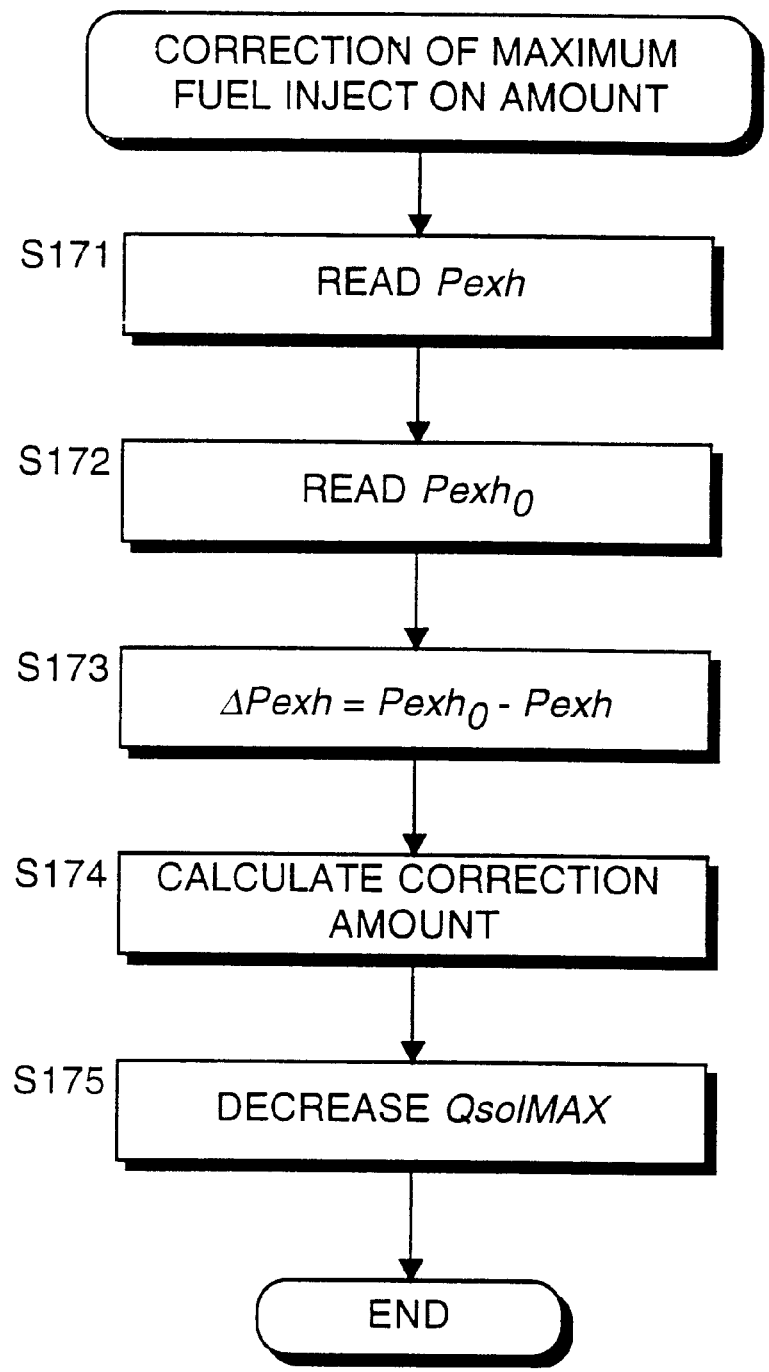
FIG. 27 is a flowchart to describe a process for compensating the maximum fuel injection amount based on the exhaust pressure Pexh.

FIG. 27 is a flowchart showing a process for correcting the maximum fuel injection amount based on the exhaust pressure Pexh.

This process is the same as that of FIG. 26, except that the intake pressure Pm in the process of FIG. 26 is replaced by the exhaust pressure Pexh.

Figure 28:
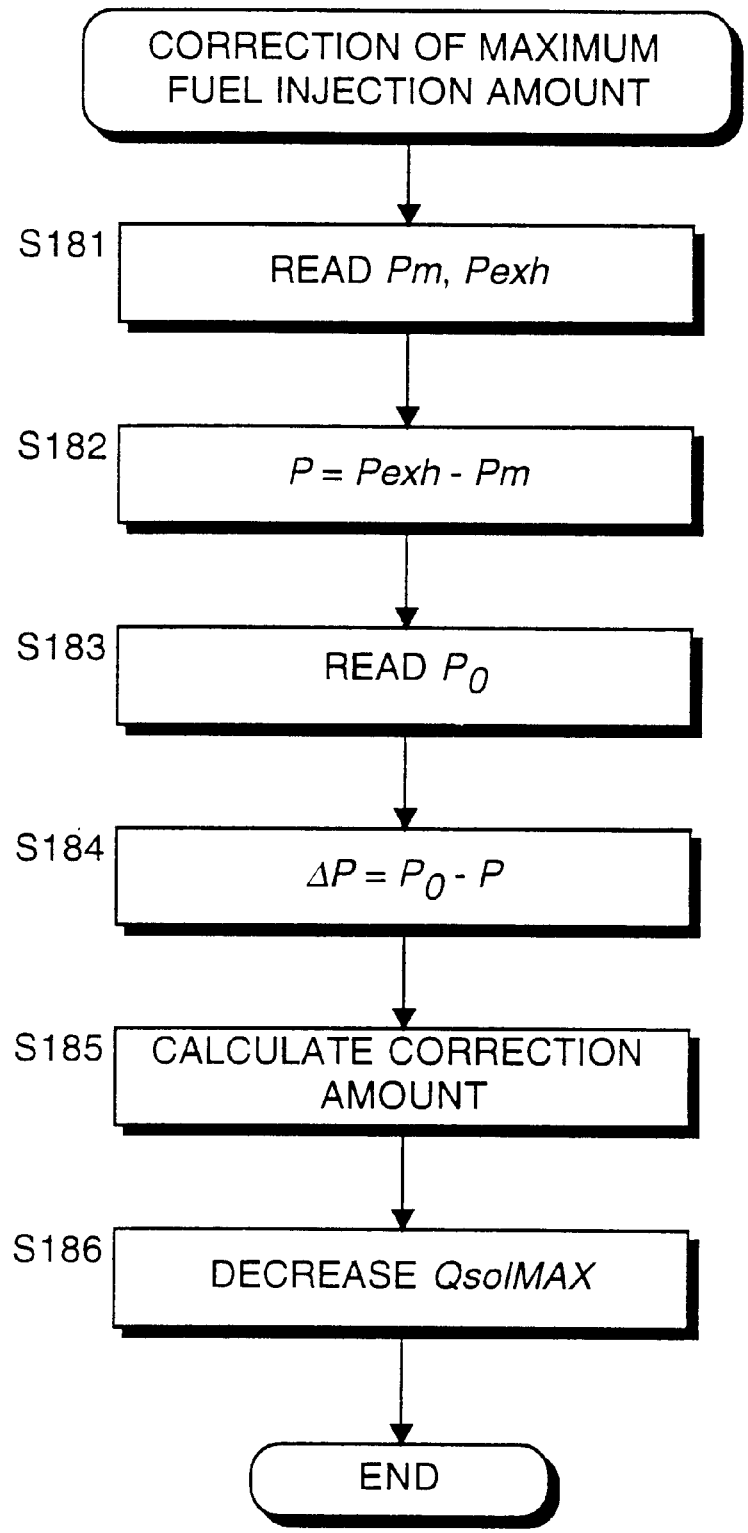
FIG. 28 is a flowchart to describe a process for compensating the maximum fuel injection amount based on a differential pressure ΔP between the intake pressure Pm and the exhaust pressure Pexh performed by the diagnostic device.

FIG. 28 is a flowchart showing a process for correcting the maximum fuel injection amount based on the differential pressure P between the intake pressure Pm and the exhaust pressure Pexh.

First, in a step S181, the intake pressure Pm and the exhaust pressure Pexh are read. In a step S182, the differential pressure P between the intake pressure Pm and the exhaust pressure Pexh, i.e. P=Pexh−Pm, is calculated.

In a step S183, the reference value $P_0$ corresponding to engine running conditions at that time is read, and in a step S184, the difference $\Delta P$ between the differential pressure P and the reference value $P_0$, i.e. $\Delta P = P - P_0$, is calculated.

In a step S185, a correction value is found from the difference $\Delta P$ using the map shown in FIG. 29, and in a step S186, the maximum fuel injection amount QsolMAX is reduced by the correction value that found.

The effect of applying this correction is such that the correction becomes larger and the maximum fuel injection amount QsolMAX becomes less, the larger the difference $\Delta P$, as shown in FIG. 29.

The amount of smoke emitted can be reduced by the correction process of FIG. 27 or the correction process of FIG. 28 in the same way as the correction process of FIG. 26.

Figure 30:
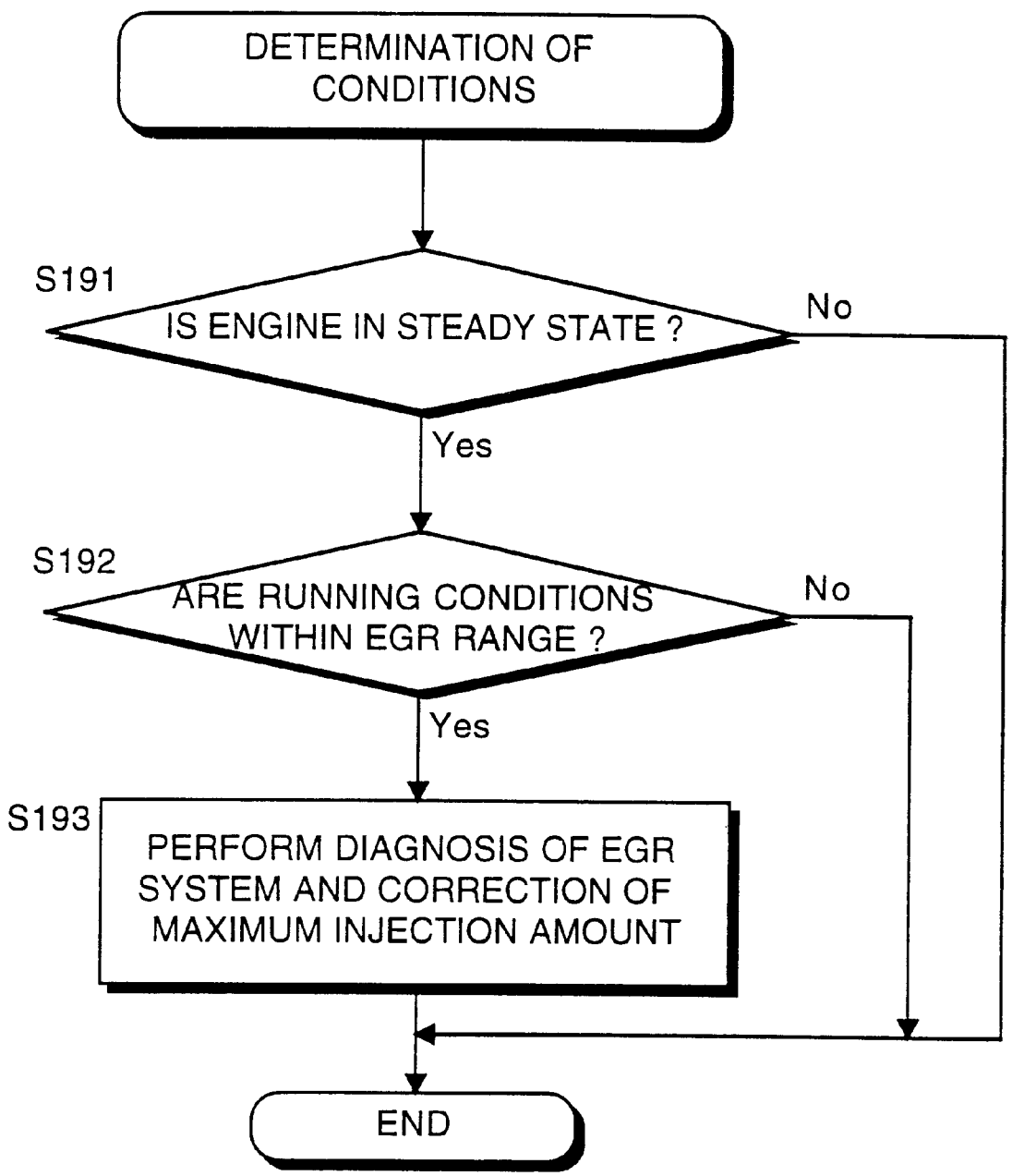
FIG. 30 is a flowchart to describe a process for determining whether or not to perform fault diagnosis and compensate the maximum fuel injection amount, performed by the diagnostic device.

FIG. 30 is a flowchart of a process for determining whether or not to perform fault diagnosis of the EGR system and correction of the maximum fuel injection amount.

Herein, in a step S191, it is determined whether or not engine running conditions are a predetermined steady state, i.e. it is determined that the engine is in a predetermined steady state when the engine rotation speed Ne and fuel injection amount Qso lie respectively in the vicinity of predetermined values, and the variations in these values lie within predetermined values.

In a step S192, it is determined whether or not the running conditions are within an EGR execution range.

When the running conditions are within the EGR region, fault diagnosis of the EGR system and correction of the maximum fuel injection amount are permitted in a step S193. The aforementioned EGR system fault diagnosis and maximum fuel injection amount correction are then performed.

On the other hand when it is determined in the step S191 that steady state conditions do not exist, or it is determined in the step S192 that running conditions are outside the EGR execution range, this process is terminated without permitting fault diagnosis of the EGR system and correction of the maximum fuel injection amount.

A second embodiment of this invention will now be described referring to FIG. 31. The construction of the hardware of this embodiment is identical to that of the first embodiment.

Firs, the concept of this embodiment will be described. Herein, it is assumed that a value obtained by dividing the EGR gas flowrate Qe by a weighted average fresh air flowrate $Qas_0$ is entered in an estimated intake EGR factor Regr. When the EGR valve 7 is operating normally, this value is equal to the target EGR rate Megr.

However, when the EGR valve 7 has a fault, e.g. when the EGR valve 7 is fixed in a wide open position, unwanted EGR takes place even when the target EGR rate Megr is low, and the fresh air flowrate $Qas_0$ and cylinder intake fresh air amount detected by the air flow meter 12 largely decrease. When the cylinder intake fresh air amount Qac decreases, the calculated value of the required EGR amount Tqe also decreases. Based on the cylinder fresh air intake amount Qac, the exhaust pressure Pexh and intake pressure Pm also vary. In this case, there is more variation of the intake pressure Pm, and the differential pressure Pexh−Pm between Pexh and Pm is smaller than its true value.

The decrease in the required EGR amount Tqe and decrease of differential pressure Pexh−Pm actually cancel each other out, so the calculated value of the EGR valve required flowpath sectional area Tav calculated by equation (12) does not much vary.

Figure 14:
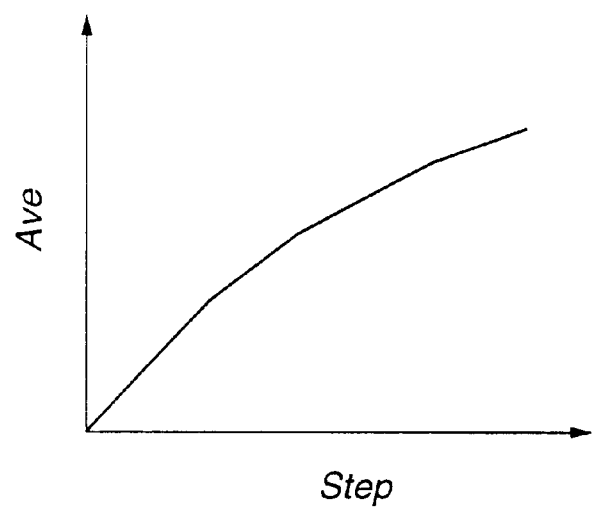
FIG. 14 is a diagram showing the contents of a table of an EGR flowpath sectional area Ave stored by the diagnostic device.

Consequently, there is not much change in the number of steps Step which is related to the EGR valve required flowpath surface area Tav as shown in FIG. 16, nor much change in the EGR flowpath sectional area Ave which is related to the number of steps Step as shown in FIG. 14. As a result, the EGR gas flowrate Qe obtained in equation (10) decreases slightly due to the decrease of the differential pressure (Pexh−Pm). However there is a large decrease in the fresh air flowrate $Qas_0$, so the estimated EGR rate Regr assumes a larger value than the target EGR rate Megr.

This phenomenon is more evident when the EGR flowpath sectional area Ave is calculated based on a lift amount Lift detected by the lift sensor 8 instead of the number of steps Step.

Therefore, an EGR system fault may be easily be diagnosed by comparing the target EGR rate Megr with the estimated EGR rate Regr. Also, as EGR systems are normally provided with the lift sensor 8, there is no need to provide another lift sensor 8 for fault diagnosis even when the EGR flowpath surface area Ave is found from the lift amount Lift.

Figure 31:
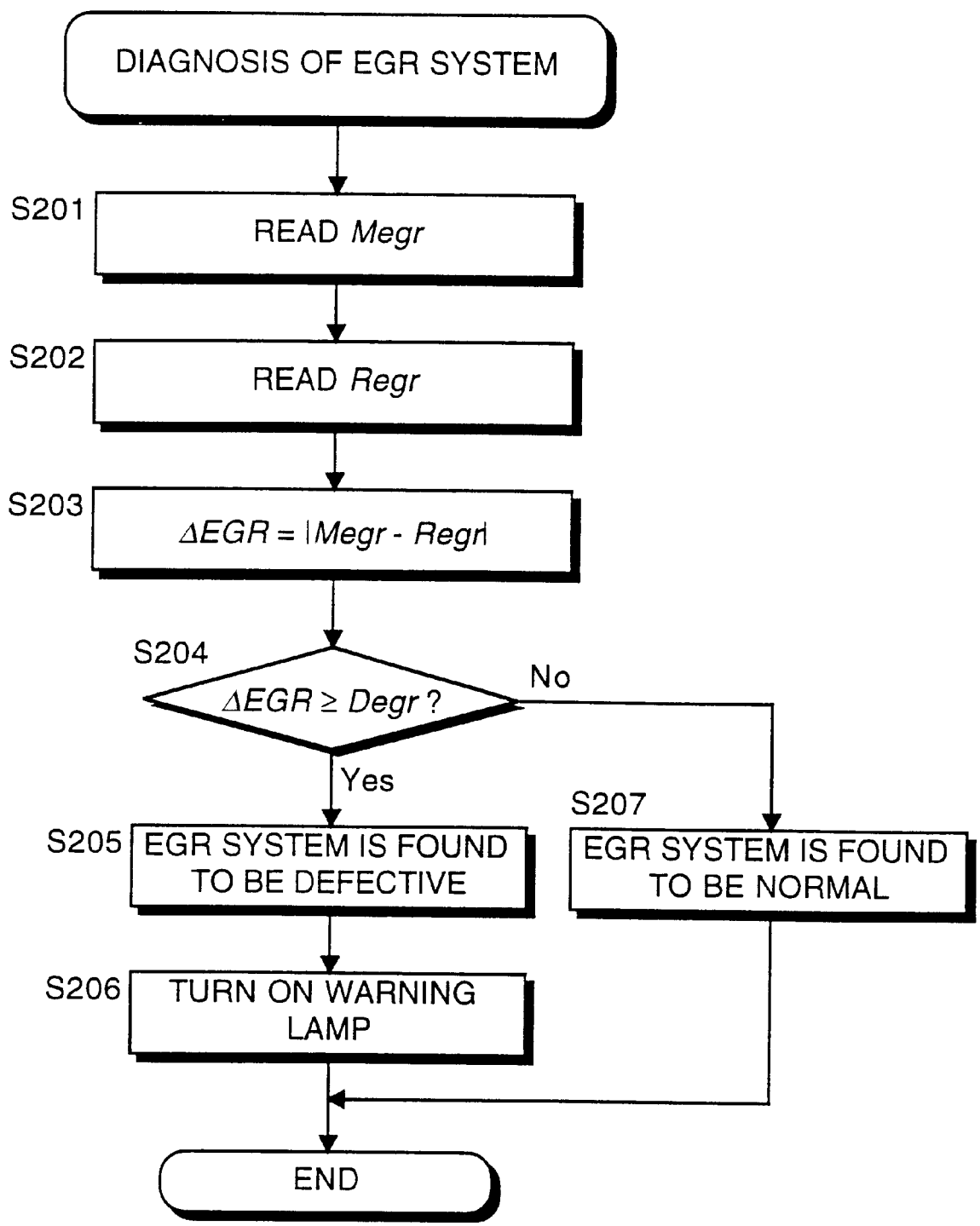
FIG. 31 is a flowchart to describe a fault diagnosis process according to a second embodiment of this invention.

FIG. 31 shows a process for diagnosing a fault of the EGR valve 7 based on the aforesaid theory.

First, in a step S201, the target EGR rate is read, and in a step S202, the estimated EGR rate Regr is read. In a step S203, a difference Degrbetween the target EGR rate Megr and estimated EGR rate Regr is calculated.

In a step S204, a predetermined threshold value Degr stored by the control unit 10 is compared with Degr. When Degr is equal to or greater than the threshold value Degr, the routine proceeds to a step S205 and it is determined that the EGR system has a fault. In this case, a warning lamp lights in a step S206, and the routine is terminated.

When Degr is less than the threshold value Degr, it is determined that the EGR system is functioning normally in a step S207, and the routine is terminated.

Figure 32:
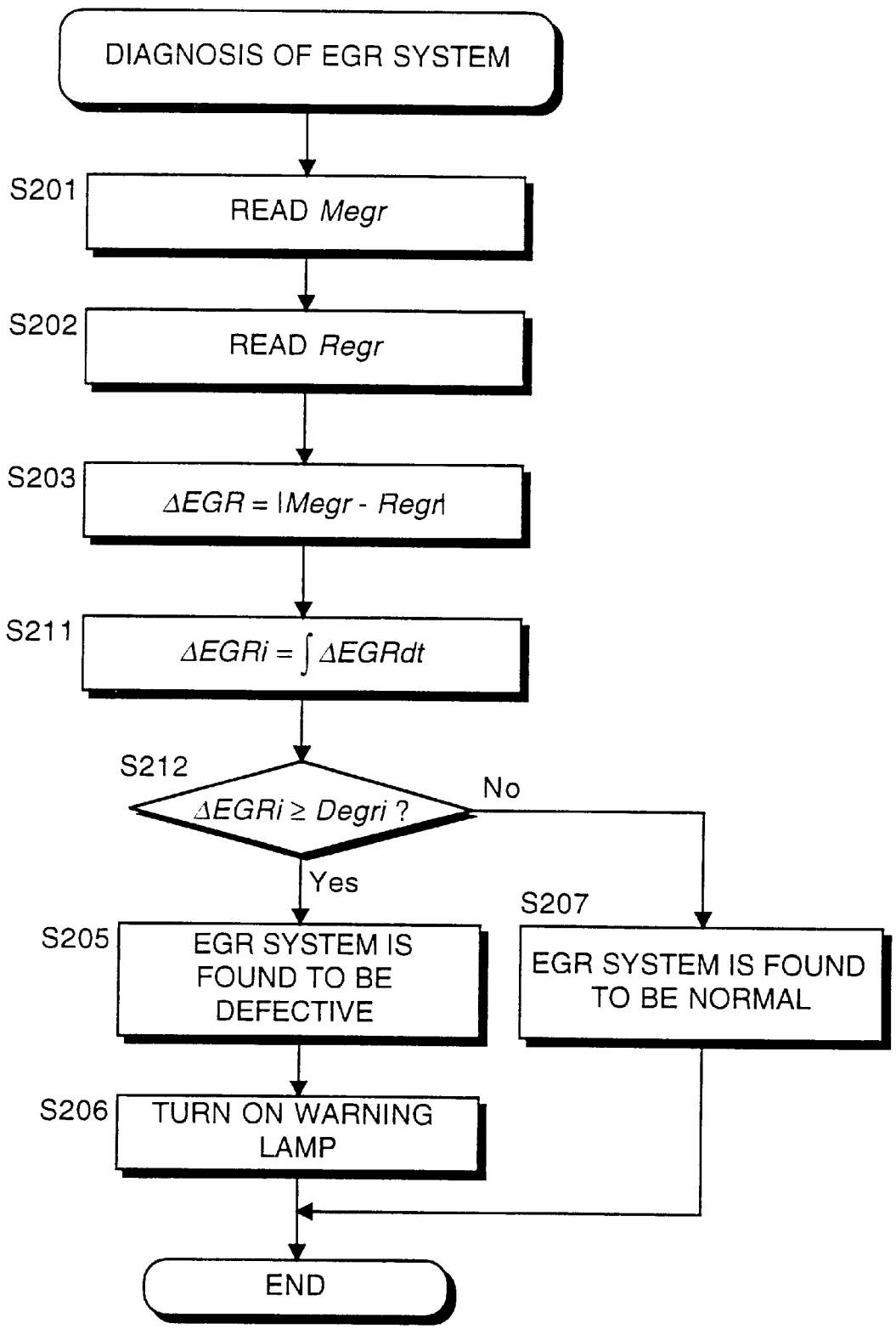
FIG. 32 is a flowchart to describe a fault diagnosis process according to a third embodiment of this invention.

FIG. 32 shows a third embodiment of this invention. According to this embodiment, steps S211 and S212 are provided instead of the steps S203 and S204 of the process of FIG. 31. In a step S211, a difference between the target EGR rate Megr and estimated EGR rate Regr is integrated over a predetermined interval. In a step S212, an integral value ΔEGRi in the predetermined interval is compared with a predetermined threshold value Degri, and when the integral value ΔEGRi is equal to or greater than the threshold value Degri, it is determined that the EGR system has a fault.

Hence, by using integral values, the effect on the diagnosis of errors due to the response delay of sensors and actuators when running conditions vary can be eliminated, and more precise fault diagnosis can be performed.

Figure 33:
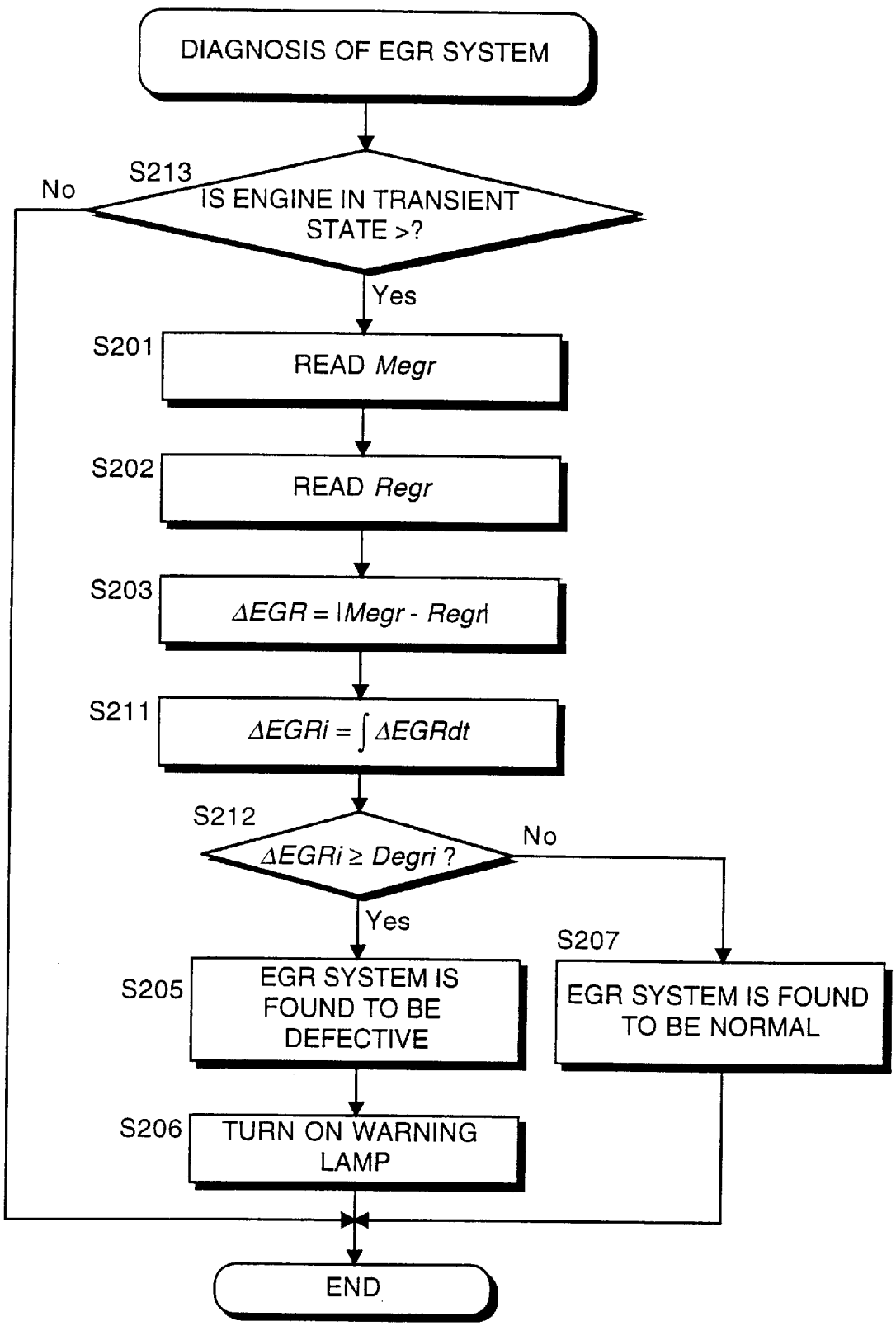
FIG. 33 is a flowchart to describe a fault diagnosis process according to a fourth embodiment of this invention.

FIG. 33 shows a fourth embodiment of this invention. According to this embodiment, a step S213 is added to the process of the third embodiment.

In this embodiment, at the start of the fault diagnosis process, it is determined in the step S213 whether the engine 1 is in a transient running state. Specifically, when there is a large variation of the engine rotation speed Ne, it is determined that transient running conditions exist. When transient running conditions do not exist, i.e. in the steady running state, fault diagnosis is not performed. Fault diagnosis is performed only during transient conditions when the variation of the engine rotation speed Ne is equal to or greater than a predetermined value.

In the steady state, when the EGR valve 7 is fixed in a state corresponding to the target EGR rate, it may not be possible to detect a fault because the difference between the target EGR rate Megr and estimated EGR factor Regr is small.

During transient running of the engine, as the that target EGR rate Megr is constantly changing, there is little probability that, when the EGR valve 7 is fixed, the difference between the target EGR rate Megr and estimated EGR factor Regr will remain small. Also in general, regarding the difference between the target EGR rate Megr and estimated EGR factor Regr in the transient state, there is a considerable discrepancy between the case where the EGR valve 7 is working normally and the case where it is fixed, as shown in FIGS. 34A, 34B, and this discrepancy is far more conspicuous than in the steady state. The precision of fault diagnosis may therefore be improved by limiting EGR system fault diagnosis to transition running conditions.

Figure 35:
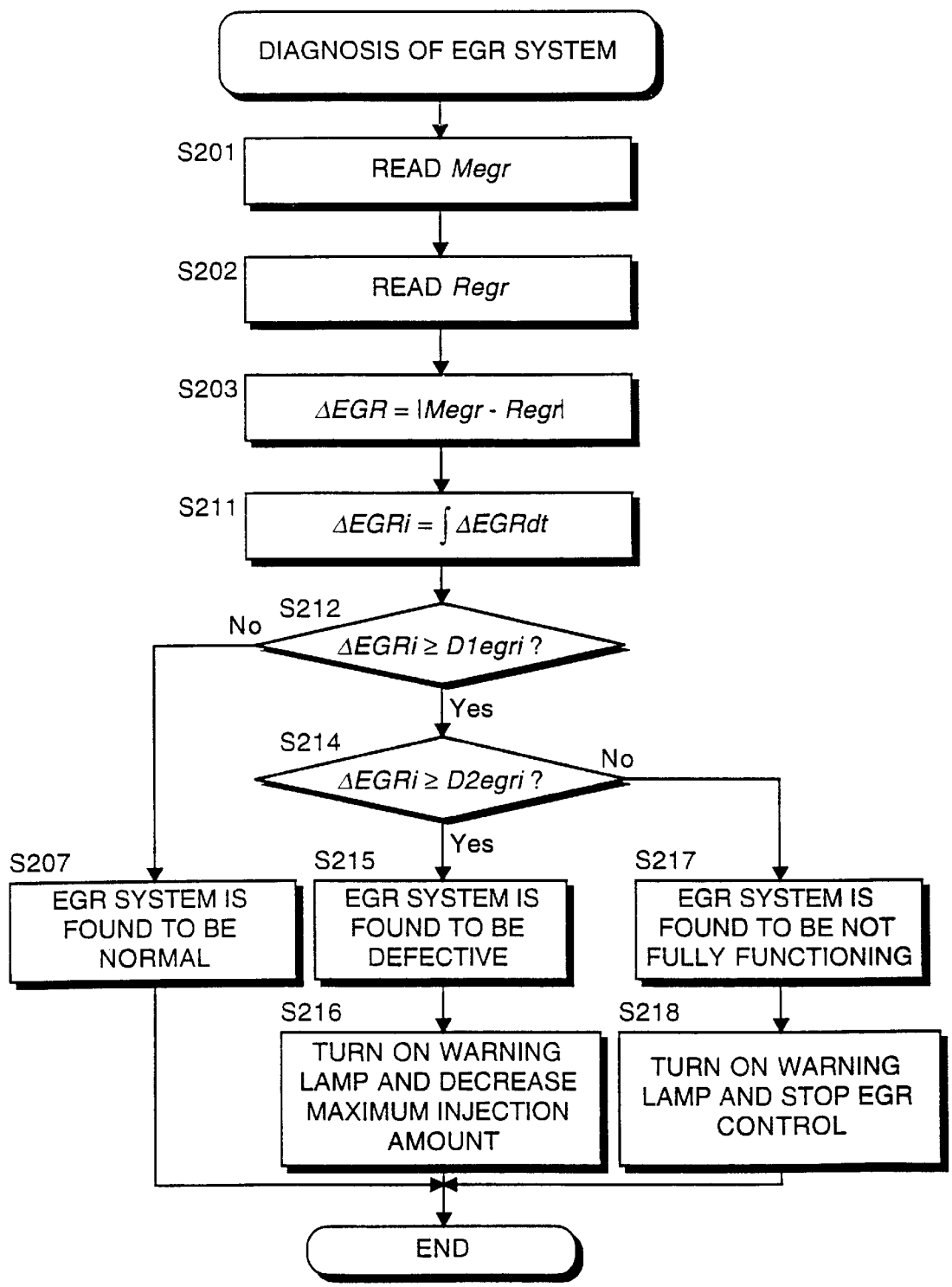
FIG. 35 is a flowchart to describe a fault diagnosis process according to a fifth embodiment of this invention.

FIG. 35 shows a fifth embodiment of this invention.

According to this embodiment, a plurality of threshold values are provided for fault determination so as to determine the extent of a fault in the EGR system.

The processing from the step S201 to the step S211 is the same as that of the third embodiment.

In the step S212, an integral value ΔEGRi is compared with a threshold value D1egri. When the integral value ΔEGRi is less than the threshold value D1egri, it is determined in a step S207 that the EGR system is normal and the process is terminated.

On the other hand, when it is determined in the step S212 that the integral value ΔEGRi is equal to or greater than the threshold value D1egri, the integral value ΔEGRI is compared with a threshold value D2egri in a following step S214. The threshold value D2egri is set to be larger than the threshold value D1egri.

When the integral value Degri is also equal to or greater than the threshold value D2egri, it is determined in a step S215 that the EGR valve 7 is fixed, a warning lamp 16 lights in a step S216, and a change-over is made to a limited running mode. In this limited mode, for example, a process may be performed to correct the maximum fuel injection amount shown in FIG. 28 of the first embodiment. By limiting the maximum fuel injection amount, the running of the engine is limited so that the vehicle can reach a repair shop on its own. On the other hand when, in the step S214, ΔEGRi is less than the threshold value D2egri, it is determined in a step S217 that the EGR valve 7 is not fully functioning, the warning lamp 16 lights in a step S218, and the EGR valve 7 is fully closed so that secondary problems, such as structural deformation of the component part of the intake system due to recirculation of a large amount of hot exhaust gas, do not arise.

In this way, by assessing the extent of a fault, appropriate action may be taken to deal with the fault depending on its extent.

In the aforesaid second—fifth embodiments, fault diagnosis was performed using the difference Aegr between the target EGR rate Megr and estimated EGR rate Regr, but fault diagnosis may be performed using also the ratio of the target EGR factor Megr and estimated EGR factor Regr.

For example, in the fault diagnosis process shown in FIG. 31 of the second embodiment, the equation ΔEGR=|Megr−Reg| of the step S202 may be replaced by ΔEGR=Megr|Regr, and the determination of the step S204 may be replaced by $Degr_{min} < \Delta EGR < Degr_{max}$. In other words, it is determined whether or not ΔEGR lies within a predetermined range. When ΔEGR lies outside this range, it is determined that the EGR system has a fault.

Also, in the processes of FIGS. 32, 33 and FIG. 35, corresponding steps may be replaced as described above.

It will of course be understood that a desirable effect is obtained by combining the process for correcting the maximum fuel injection amount be shown in FIGS. 26–28 of the first embodiment, with any of the second—fifth embodiments.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. A device for diagnosing a fault in an exhaust gas recirculation system of a diesel engine, comprising:
   means for detecting a flowrate of fresh air entering said engine,
   means for predicting an intake pressure of said engine from said fresh air flowrate,
   means for predicting an exhaust pressure of said engine from said fresh air flowrate, and
   means for determining whether or not there is a fault in said exhaust gas recirculating system based on said intake pressure and said exhaust pressure.

2. A device for diagnosing a fault in an exhaust gas recirculation system of a diesel engine, comprising:
   a sensor for detecting a flowrate of fresh air entering said engine, and
   a microprocessor is programmed to:
      predict an intake pressure of said engine from said fresh air intake flowrate,
      predict an exhaust pressure of said engine from said fresh air intake flowrate, and
      determine whether or not there is a fault in the exhaust gas recirculation system based on said intake pressure and exhaust pressure.

3. A fault diagnosis device as defined in claim 2, wherein said microprocessor is programmed to calculate a differential pressure by subtracting said intake pressure from said exhaust pressure, and to determine that there is a fault in said system when said differential pressure exceeds a predetermined value.

4. A fault diagnosis device as defined in claim 1, wherein said engine comprises a fuel injection device, and said microprocessor is further programmed to calculating a differential pressure between said intake pressure and a predetermined reference pressure, and to decrease a maximum fuel injection amount of said fuel injection device the larger said differential pressure.

5. A fault diagnosis device as defined in claim 1, wherein said engine comprises a fuel injection device, and said microprocessor is further programmed to calculate a differential pressure between said exhaust pressure and a predetermined reference pressure, and to decrease a maximum fuel injection amount of said fuel injection device the larger said differential pressure.

6. A fault diagnosis device as defined in claim 1, wherein said engine comprises a fuel injection device, and said microprocessor is further programmed to calculate a differential pressure by subtracting said intake pressure from said exhaust pressure, and to decrease a maximum fuel injection amount of said fuel injection device the larger said differential pressure.

7. A fault diagnosis device as defined in claim 1, wherein said exhaust gas recirculation system comprises an exhaust gas recirculation valve for regulating an exhaust gas recirculation amount based on a target EGR rate, and said microprocessor is further programmed to calculate an exhaust gas recirculating flowrate from said intake pressure and exhaust pressure, calculate an estimated EGR rate from said fresh air flowrate and said exhaust gas recirculating flowrate, and determine whether or not there is a fault in said exhaust gas recirculation system based on said target EGR rate and said estimated EGR rate.

8. A fault diagnosis device as defined in claim 7, wherein said microprocessor is programmed to determine that there is a fault in said exhaust gas recirculation system when a difference between said target EGR rate and said estimated EGR rate is greater than a predetermined threshold value.

9. A fault diagnosis device as defined in claim 8, wherein said microprocessor is programmed to compare the difference between said target EGR rate and said estimated EGR rate with a plurality of different predetermined threshold values, and estimate an extent of a fault in said exhaust gas recirculation system according to the result of said comparison.

10. A fault diagnosis device as defined in claim 7, wherein said microprocessor is programmed to determine that there is a fault in said exhaust gas recirculation system when an integral value of a difference between said target EGR rate and said estimated EGR rate is greater than a predetermined threshold value.

11. A fault diagnosis device as defined in claim 7, wherein said microprocessor is programmed to compare an integral value of a difference between said target EGR rate and said estimated EGR rate with a plurality of different predetermined threshold values, and to determine the extent of a fault in said exhaust gas recirculation system according to the result of said comparison.

12. A fault diagnosis device as defined in claim 7, wherein said microprocessor is programmed to determine that there is a fault in said exhaust gas recirculation system when a ratio between said target EGR rate and said estimated EGR rate lies outside a predetermined range.

13. A fault diagnosis device as defined in claim 7, wherein said microprocessor is further programmed to determine whether or not said engine is in a transient running state, and not to perform said fault diagnosing when said engine is not in said transient running state.

14. A fault diagnosis device as defined in claim 13, further comprising a sensor for detecting a rotation speed of said engine, and wherein said microprocessor is programmed to determine whether or not said engine is in said transient running state based on a variation of engine rotation speed.

* * * * *

UNITED STATES PATENT AND TRADEMARK OFFICE
CERTIFICATE OF CORRECTION

PATENT NO. : 5,964,820
DATED : October 12, 1999
INVENTOR(S) : Hiromichi Miwa et al.

It is certified that error appears in the above-identified patent and that said Letters Patent is hereby corrected as shown below:

<u>Title page, Item [54] and Column 1, line 3,</u>
After "DIAGNOSTIC" please insert -- DEVICE --.

<u>Column 7,</u>
Line 46, delete "Osol" and insert -- Qsol --.

<u>Column 8,</u>
Line 32, delete "3102" and insert -- S102 --;
Line 34, delete "Tqeco$_0$" and insert -- Tqec$_0$ --;
Line 37, delete "Tqeco" and insert -- Tqec$_0$ --.

<u>Column 13,</u>
Line 31, delete "Aegr" and insert -- Δegr --.

<u>Column 14,</u>
Line 19, delete "1" and insert therefore -- 2 --;
Line 21, delete "calculating" and insert therefore -- calculate --;
Lines 26, 33 and 40, delete "1" and insert therefore -- 2 --.

Signed and Sealed this

Tenth Day of December, 2002

JAMES E. ROGAN
*Director of the United States Patent and Trademark Office*